United States Patent [19]

Sasada et al.

[11] Patent Number: 4,861,983
[45] Date of Patent: Aug. 29, 1989

[54] OPTICAL SYSTEM FOR FLYING-SPOT SCANNING SYSTEM

[75] Inventors: Shigeru Sasada; Shinichi Nagata; Makoto Hirosawa; Yoshihiro Kishida, all of Kyoto, Japan

[73] Assignee: Dainippon Screen Mfg. Co., Ltd., Japan

[21] Appl. No.: 186,386

[22] Filed: Apr. 26, 1988

[30] Foreign Application Priority Data

Apr. 27, 1987 [JP] Japan ............................... 62-101799
Apr. 27, 1987 [JP] Japan ............................... 62-101800
May 13, 1987 [JP] Japan ............................... 62-114704

[51] Int. Cl.$^4$ ..................... H01J 3/14; G02B 26/08; G01D 9/42
[52] U.S. Cl. ..................................... 250/235; 250/236; 350/6.5; 346/108
[58] Field of Search ................. 250/235, 236; 350/6.8, 350/6.7, 6.6, 6.5, 96.14, 356; 346/108; 358/293, 294, 296

[56] References Cited

U.S. PATENT DOCUMENTS

| 4,053,898 | 10/1977 | Hirayama et al. | 346/108 |
| 4,103,160 | 7/1978 | Moss | 346/108 |
| 4,248,495 | 2/1981 | Minoura | 250/235 |
| 4,318,583 | 3/1982 | Goshima et al. | 350/6.8 |
| 4,343,531 | 8/1982 | Tateoka et al. | 350/6.5 |
| 4,527,858 | 7/1985 | Takahashi et al. | 350/6.8 |
| 4,715,699 | 12/1987 | Morimoto | 350/6.8 |
| 4,756,584 | 7/1988 | Takahashi et al. | 350/6.8 |

Primary Examiner—David C. Nelms
Assistant Examiner—Michael Messinger
Attorney, Agent, or Firm—Ostrolenk, Faber, Gerb & Soffen

[57] ABSTRACT

An optical system, useful for a flying-spot scanning apparatus includes a laser tube, an acousto-optical modulator, a deflecting mirror directing the laser beam in a first direction, and an objective lens having the characteristic of $h = f \cdot \sin \theta$, where h is the distance on an object between the optical axis and the point upon which the laser beam impinges, f is the focal length of the objective lens and $\theta$ is the angle formed by the beam entering the objective lens with respect to the optical axis. The objective lens includes a first optical unit having the negative focal length and a second optical unit having a positive focal length. The third-order distortion coefficient of the objective lens is approximately "1". Straight and parallel scanning loci can be effected on a recording medium, as the recording medium is fed in a second direction.

28 Claims, 28 Drawing Sheets

Fig.1-(A)
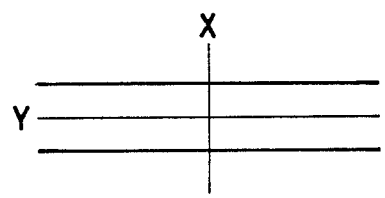
Fig.1-(B)
*PRIOR ART*
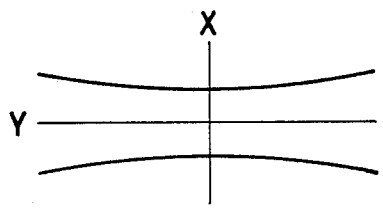
Fig.9
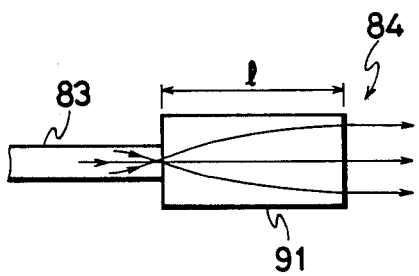
Fig.2-(B)
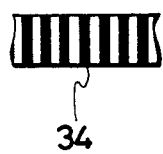
Fig.10
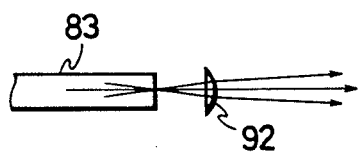

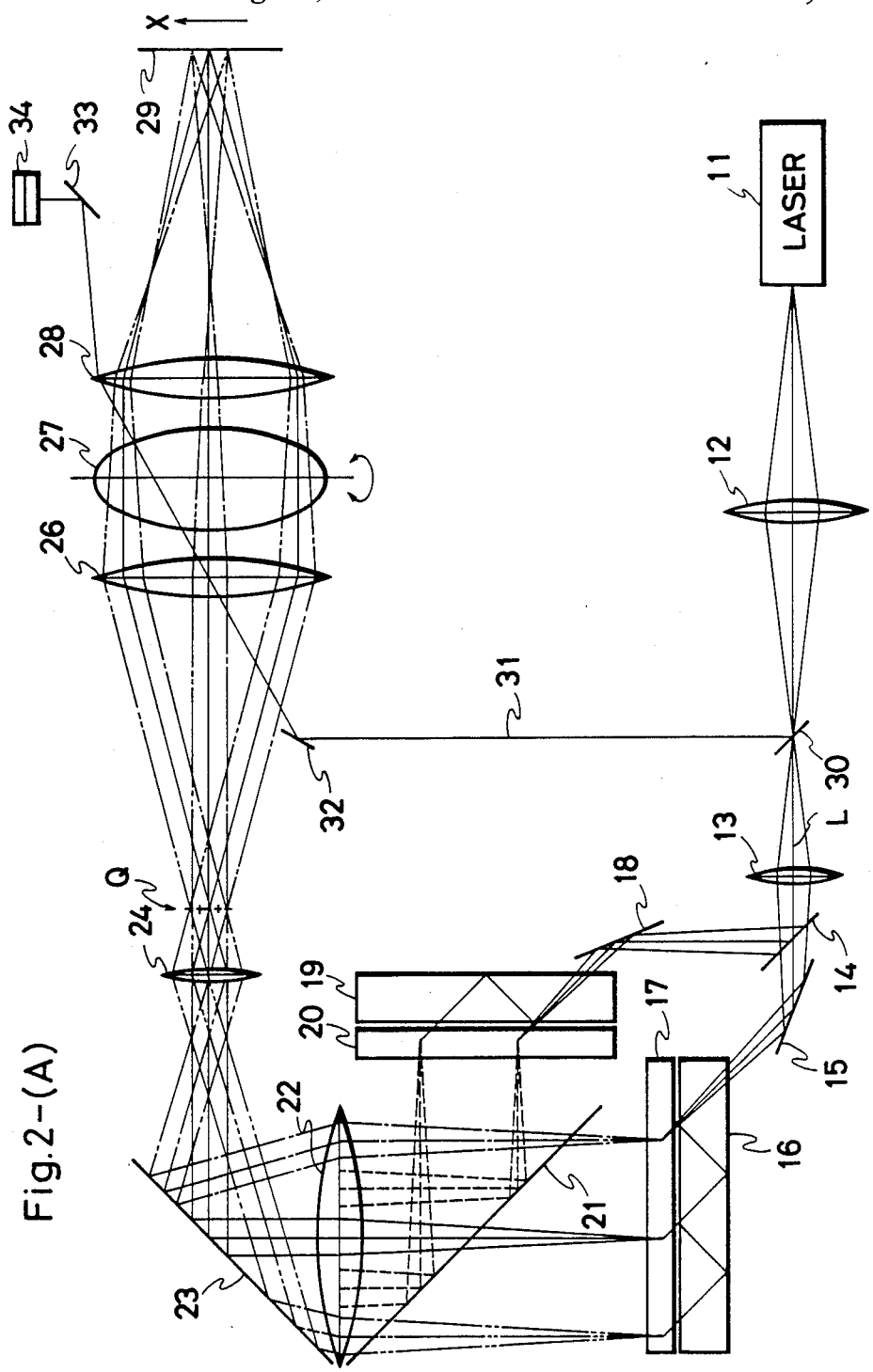
Fig.2-(A)

Fig.18-(A)
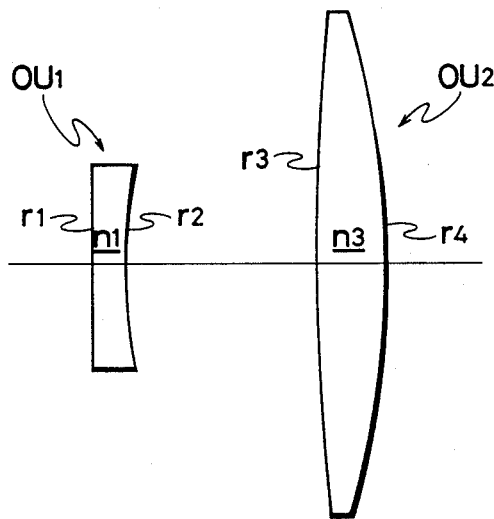
Fig.18-(B)
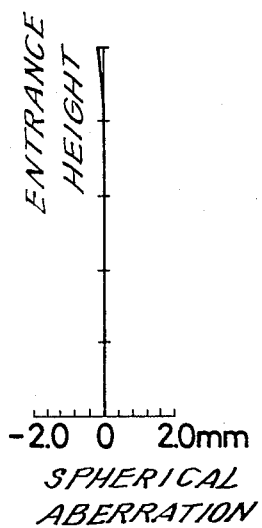
SPHERICAL
ABERRATION
Fig.18-(C)
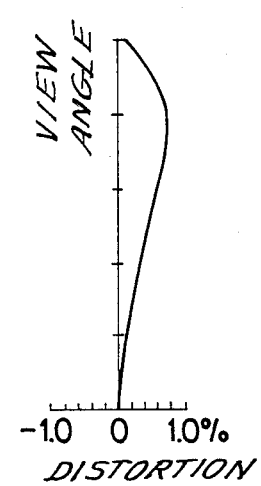
ASTIGMATISM
Fig.18-(D)
DISTORTION Fig.19-(A)
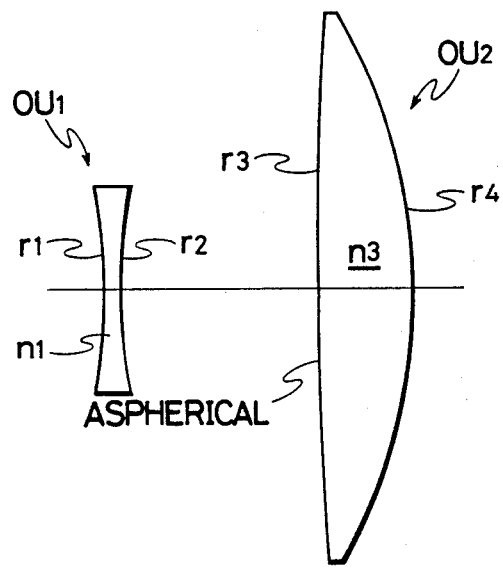
Fig.19-(B)
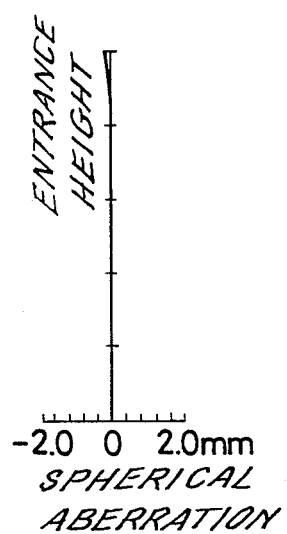
SPHERICAL ABERRATION
Fig.19-(C)
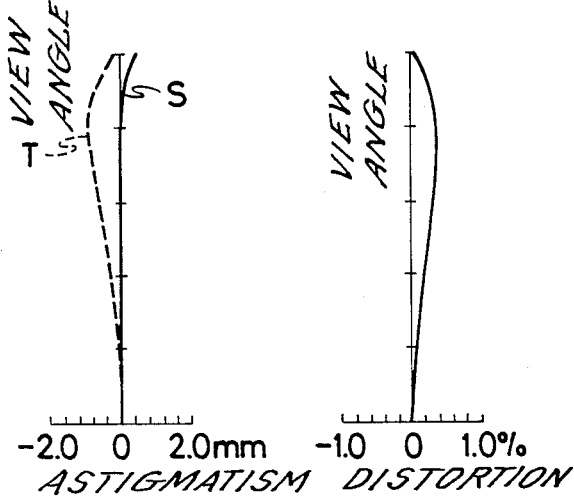
ASTIGMATISM
Fig.19-(D)
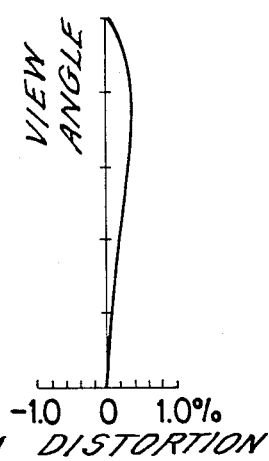
DISTORTION Fig.20-(A)
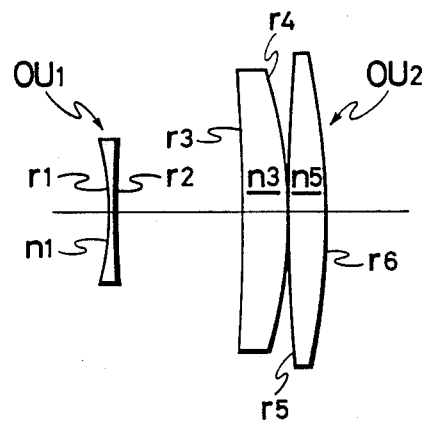
Fig.20-(B)    Fig.20-(C)    Fig.20-(D)
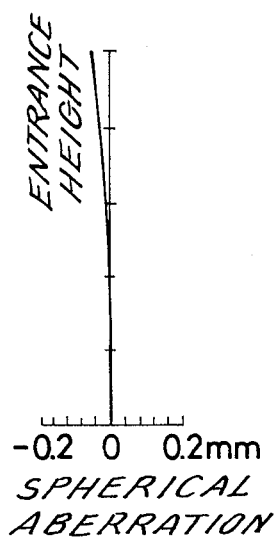 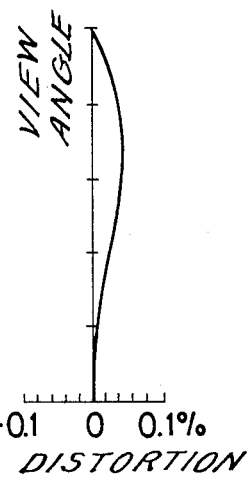 
SPHERICAL     ASTIGMATISM    DISTORTION
ABERRATION

Fig.21-(A)
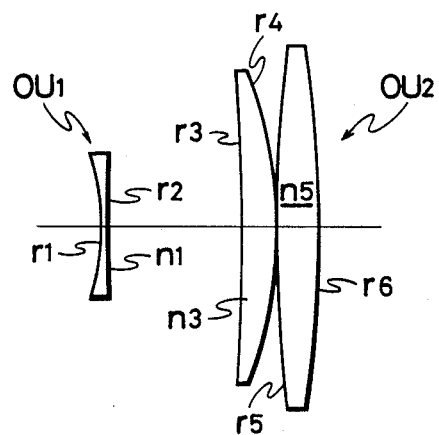
Fig.21-(B)
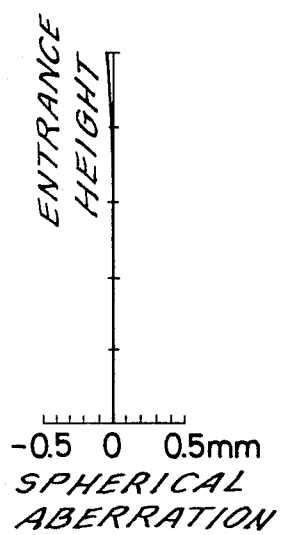
SPHERICAL ABERRATION
Fig.21-(C)
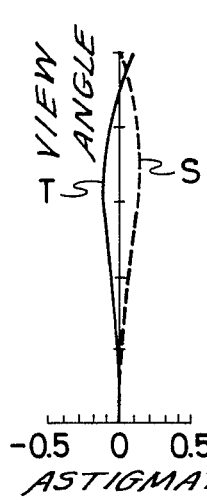
ASTIGMATISM
Fig.21-(D)
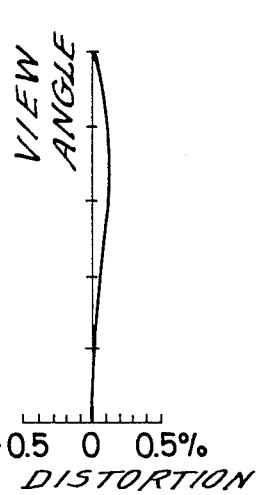
DISTORTION Fig.22-(A)
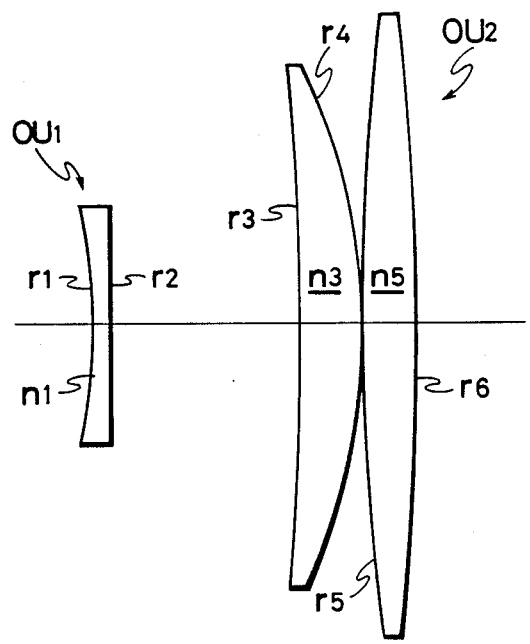
Fig.22-(B)
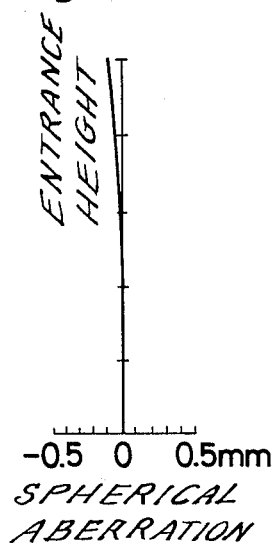
SPHERICAL
ABERRATION
Fig.22-(C)
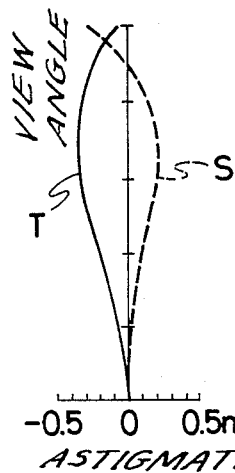
ASTIGMATISM
Fig.22-(D)
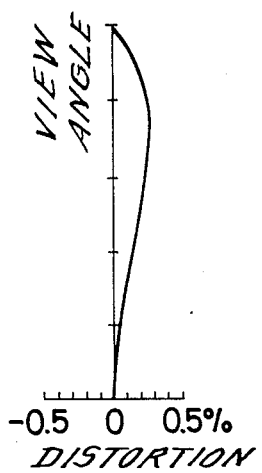
DISTORTION Fig.23-(A)
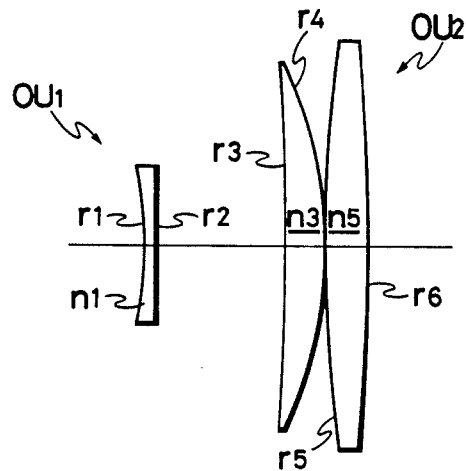
Fig.23-(B)      Fig.23-(C)      Fig.23-(D)
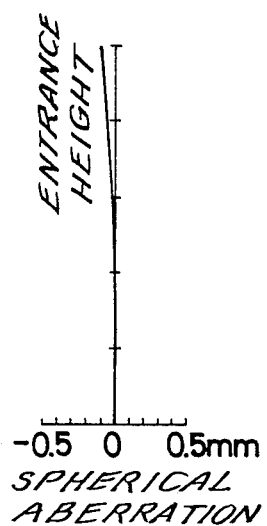 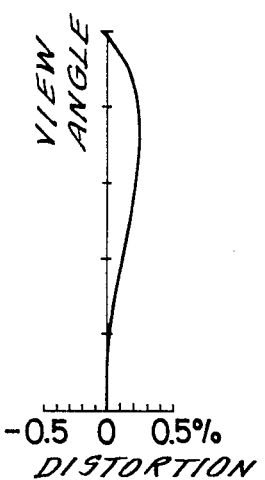 
SPHERICAL      ASTIGMATISM      DISTORTION
ABERRATION Fig.24-(A)
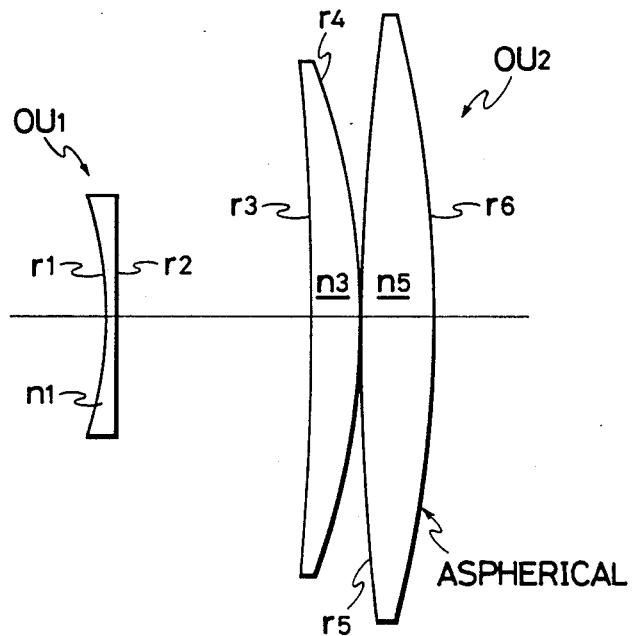
Fig.24-(B) 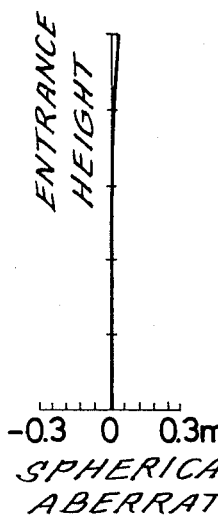
SPHERICAL ABERRATION
Fig.24-(C) 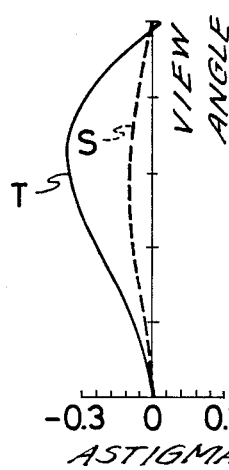
ASTIGMATISM
Fig.24-(D) 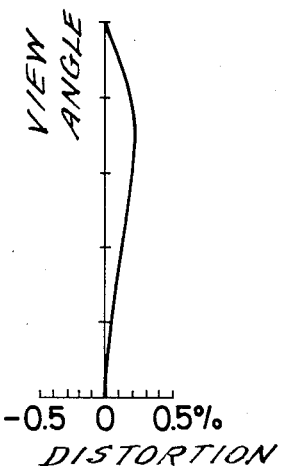
DISTORTION Fig. 25-(A)
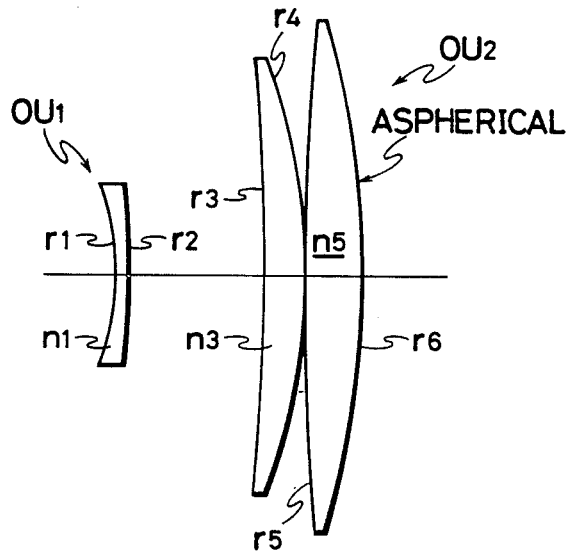
Fig. 25-(B)
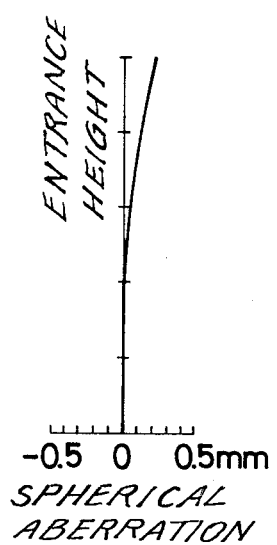
SPHERICAL
ABERRATION
Fig. 25-(C)
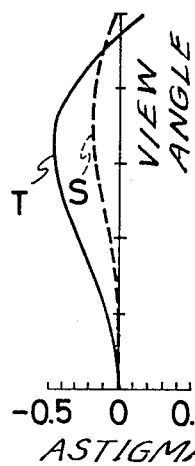
ASTIGMATISM
Fig. 25-(D)
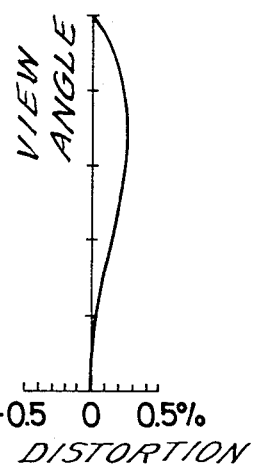
DISTORTION Fig.26-(A)
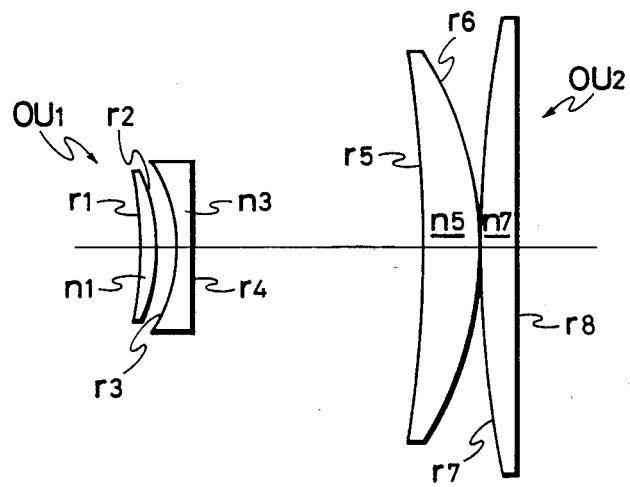
Fig.26-(B)
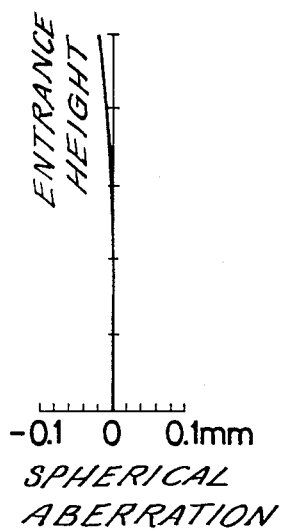
SPHERICAL ABERRATION
Fig.26-(C)
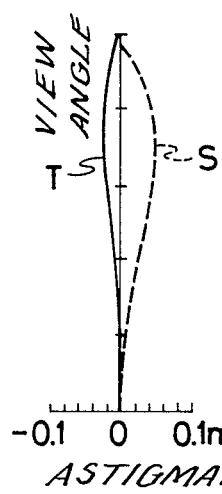
ASTIGMATISM
Fig.26-(D)
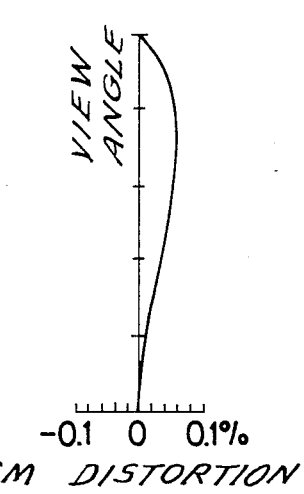
DISTORTION Fig.27-(A)
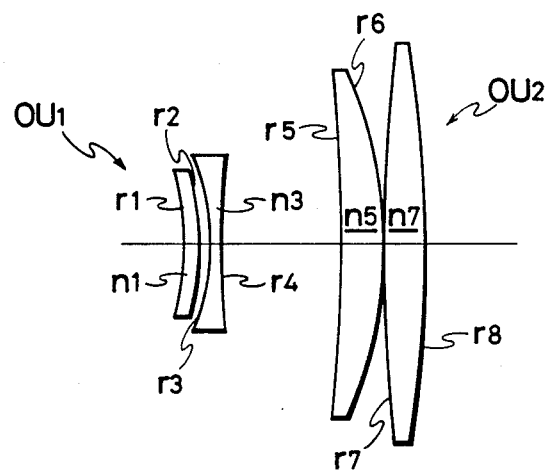
Fig.27-(B)
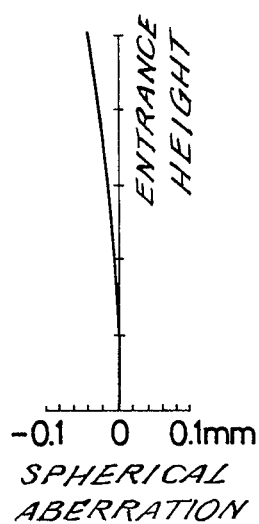
SPHERICAL ABERRATION
Fig.27-(C) Fig.27-(D)
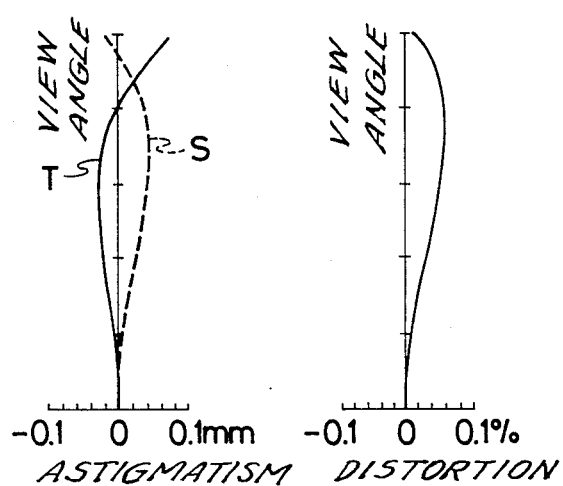
ASTIGMATISM    DISTORTION Fig.28-(A)
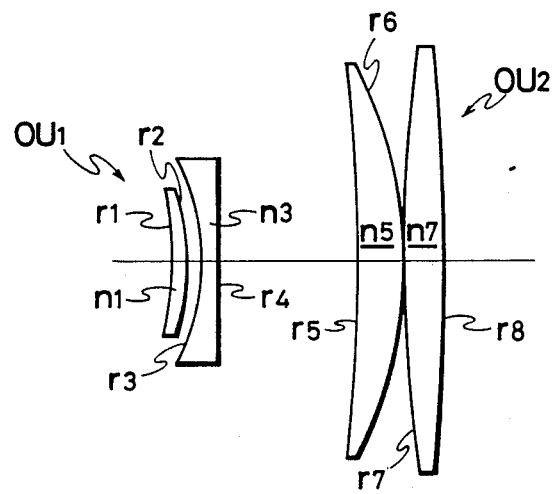
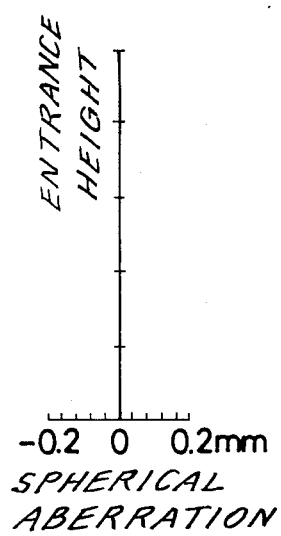
Fig.28-(B)
SPHERICAL ABERRATION
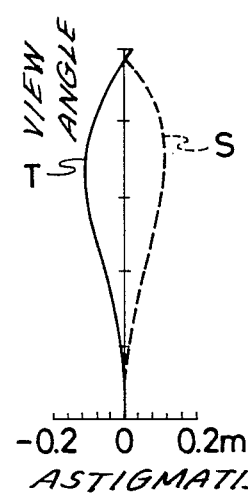
Fig.28(C)
ASTIGMATISM
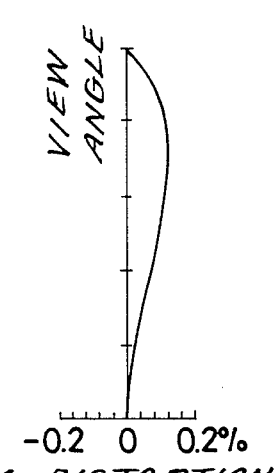
Fig.28-(D)
DISTORTION Fig.29-(A)
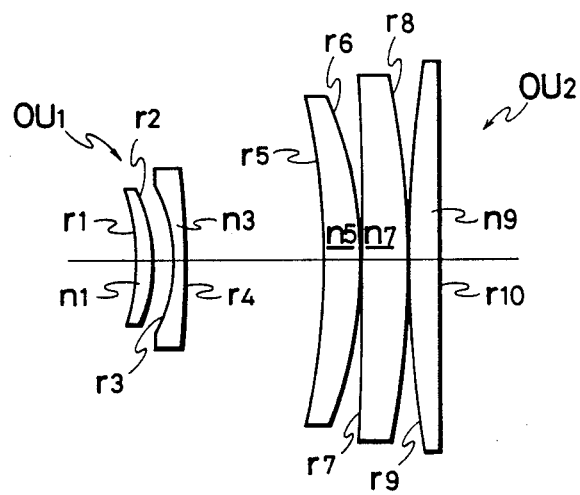
Fig.29-(B)
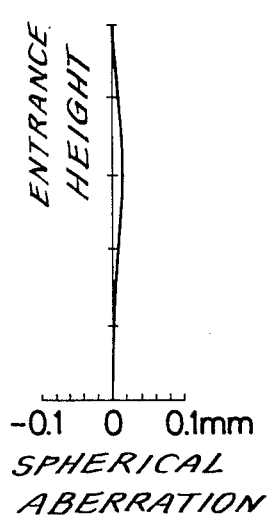
-0.1  0  0.1mm
SPHERICAL
ABERRATION
Fig.29-(C)
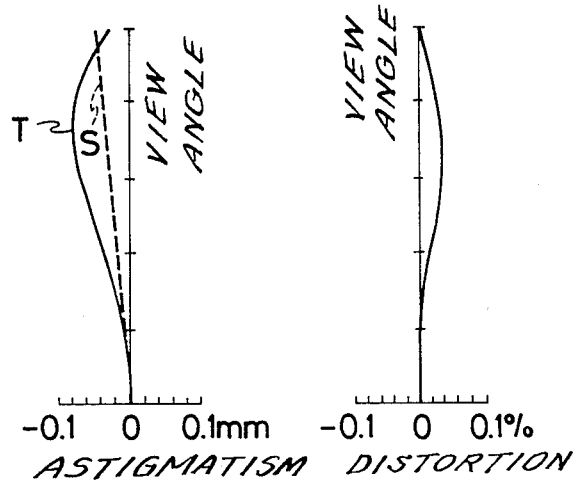
-0.1  0  0.1mm
ASTIGMATISM
Fig.29-(D)
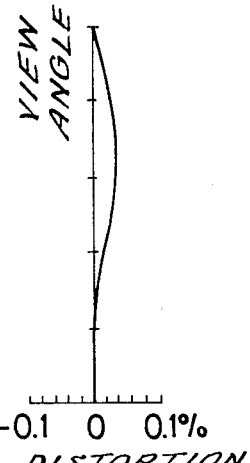
-0.1  0  0.1%
DISTORTION Fig.30-(A)
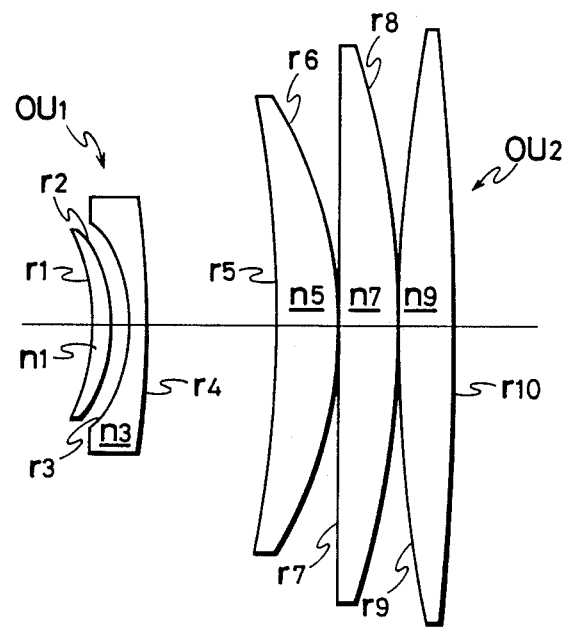
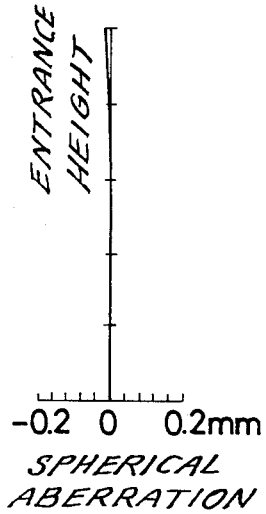
Fig.30-(B)
SPHERICAL ABERRATION
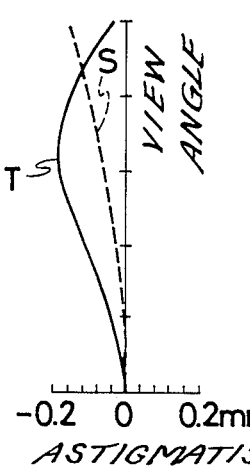
Fig.30-(C)
ASTIGMATISM
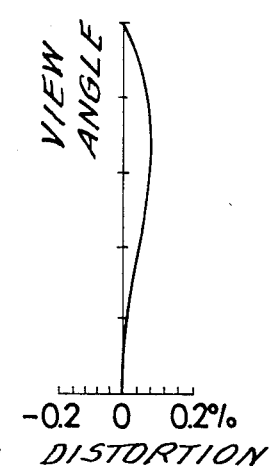
Fig.30-(D)
DISTORTION Fig.31-(A)
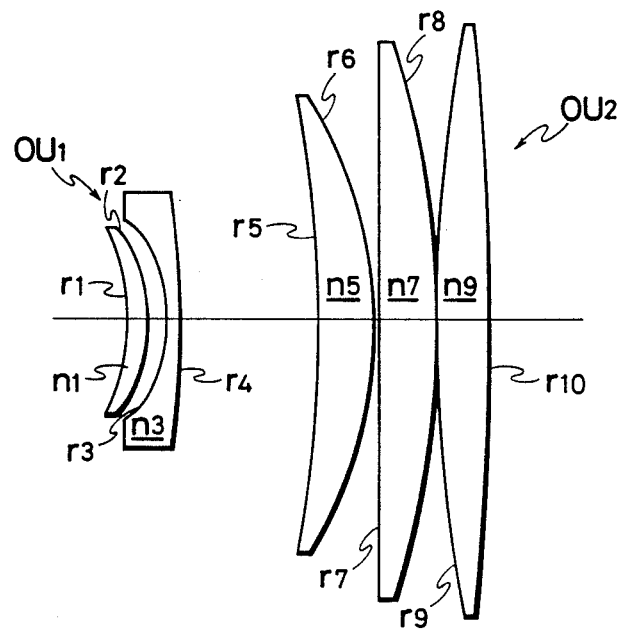
Fig.31-(B)  Fig.31-(C)  Fig.31-(D)
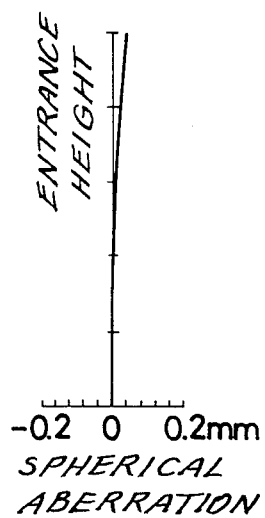
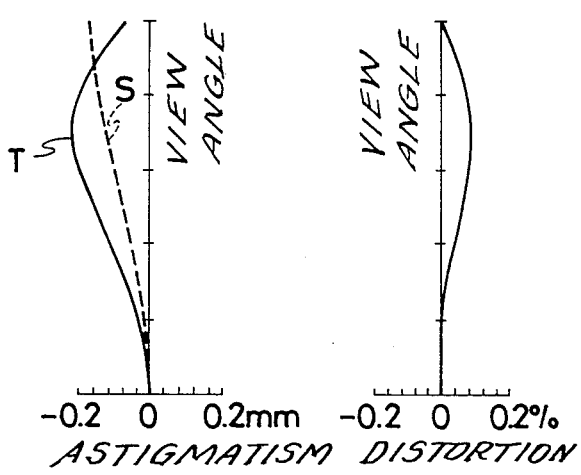

Fig. 32-(A)
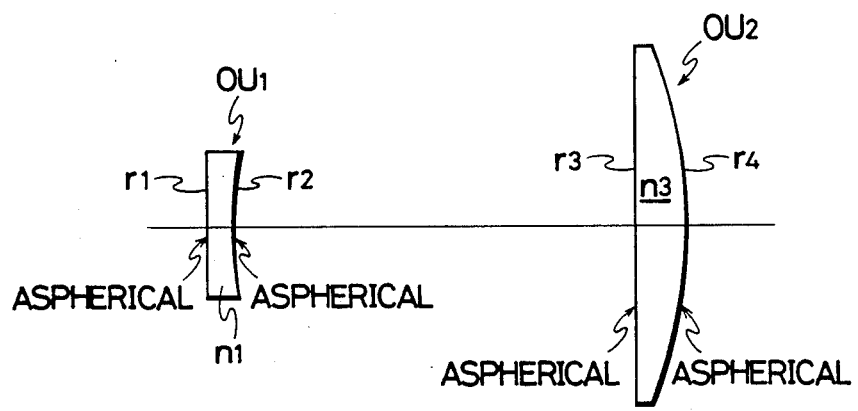
Fig. 32-(B)  Fig. 32-(C)  Fig. 32-(D)
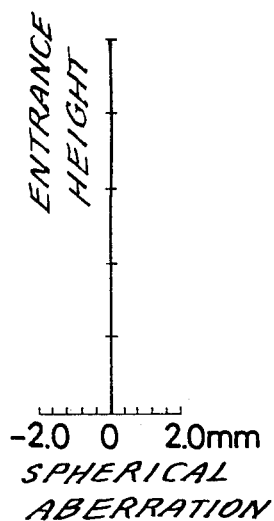
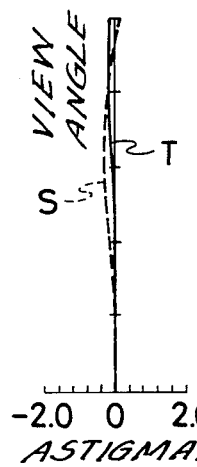
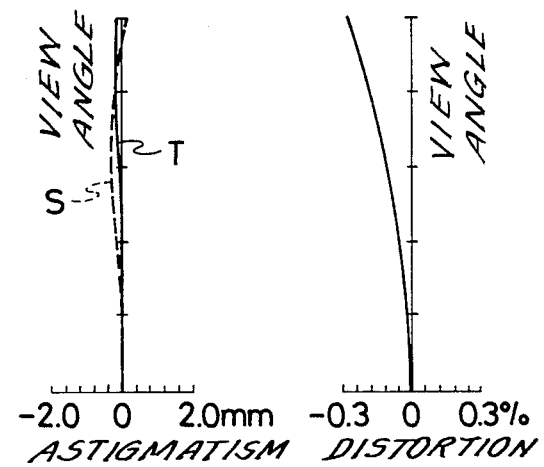

Fig.33-(A)
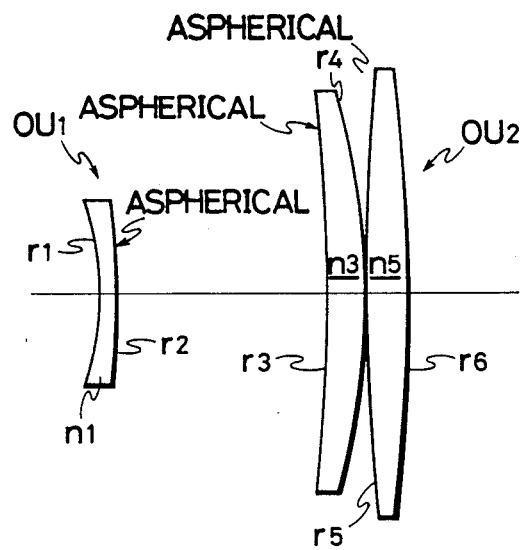
Fig.33-(B) Fig.33-(C) Fig.33-(D)
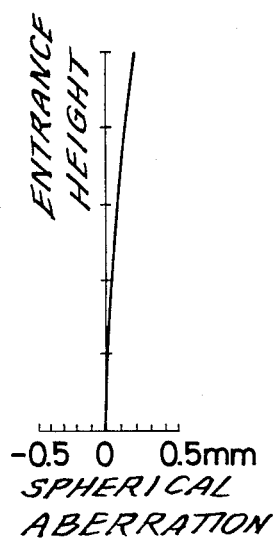 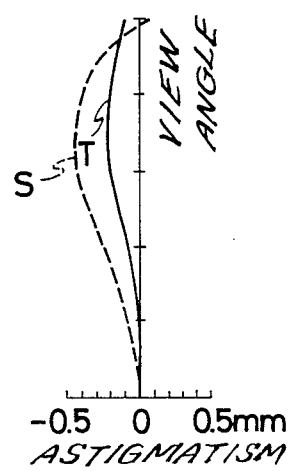 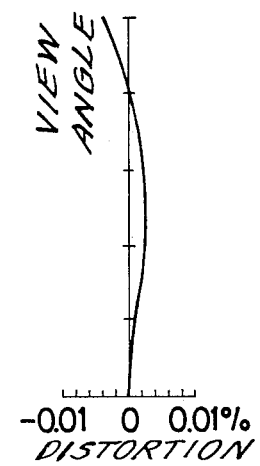

OPTICAL SYSTEM FOR FLYING-SPOT SCANNING SYSTEM

BACKGROUND OF THE INVENTION

The present invention relates generally to an improvement of an optical system for recording an image on a recording medium, and particularly to an optical system for use in a so-called flying-spot scanning system.

Flying spot scanning systems are well known, one of which is shown in the U.S. Pat. No. 4,080,634, where a deflection mirror is employed to direct a laser beam to and fro. In order to improve a scanning speed, it is generally known that a recording medium is scanned by a plurality of beams, which is taught e.g. in "Electronics" (published Oct. 7, 1985), pages 40–42.

In a conventional apparatus an f-theta lens or f-tangent theta lens is usually employed as an objective lens and is disposed between a deflection mirror and a recording medium. The f-theta lens has such characteristic that a distance between a scanning spot of a scanning beam and an optical axis of the objective lens is directly proportional to an angle formed by the beam entering the lens with respect to the optical axis (hereinafter referred to as "deflection angle"), while the f-tangent theta lens has such characteristic that a distance between a scanning spot of a scanning beam and an optical axis of the objective lens is directly proportional to the tangent of a deflection angle. Further, an arcsine-theta lens may also be employed in the case where the deflection mirror is driven by a galvanometer. The arcsine-theta lens has such characteristic that a scanning speed of a scanning spot deflected by a deflection mirror is kept constant.

When a single beam is used in such a manner as the beam deflected by a deflection mirror forms a plane in which the optical axis of the objective lens is included (hereinafter such plane is referred to as "deflection plane"), a scanning locus thereof will be made straight as shown in FIG. 1-(A). However, when a plurality of beams are used in combination with such an objective lens as an f-theta lens, f-tangent theta lens or arcsine-theta lens, scanning beams will cause such as scan-line bow as shown in FIG. 1-(B), since the beams entering the objective lens will form more or less an inclination relative to the deflection plane. Accordingly, it is necessary to make a fine adjustment of respective scanning beams, which is obviously time-consuming and hence inefficient in manufacturing an apparatus.

Furthermore, in the case where a plurality of scanning beams are employed in the optical system, only a single beam corresponding to the deflection plane can ensure a scanning locus thereof straight, and remaining beams will cause the scan-line bow, as clearly shown in FIG. 1-(B). Due to such scan-line bow, a recording medium cannot be scanned uniformly by a plurality of the scanning spots, and accordingly it is difficult to apply such multiple scanning to a practical use.

SUMMARY OF THE INVENTION

In view of the foregoing, it is a principal object of the present invention to provide an improved optical system particularly useful for a so-called flying-spot scanning system.

It is another object of the invention to provide an optical system which can resolve undesired scan-line bow caused in the case where a plurality of scanning beams are employed.

The aforementioned objects are accomplished by the present invention, with an optical system for recording an image on an recording medium, which includes a light source emitting a scanning beam; modulator means for modulating the scanning beam; deflection means disposed along the optical axis of the system for moving the scanning beam in a first direction; and an objective lens disposed optically between said deflection means and the recording medium, said objective lens having the characteristic of:

$$h = f \sin \theta \quad (1)$$

where h is the distance on an object between the optical axis thereof and the point upon which the scanning beam impinges, f is the focal length of the objective lens, and $\theta$ is the deflection angle, i.e. the angle formed by the scanning beam entering the objective lens with respect to the optical axis, said objective lens including a first optical unit having a negative focal length and a second optical unit having a positive focal length, the third-order distortion coefficient of said objective lens being approximately "1", the scanning beam being focused upon the recording medium through said objective lens to effect a scanning spot, the recording medium being fed in a second direction perpendicular to the first direction, while the scanning spot moves in the first direction.

It is preferable that the first and second optical units of the objective lens have primary and secondary principal points, respectively, the objective lens being designed to satisfy the formula:

$$D > 0.18f \quad (2)$$

where D is the distance between the secondary principal point of the first optical unit and the primary principal point of the second optical unit, and f is the focal length of the objective lens.

It is also preferable that the objective lens is designed to satisfy the formula:

$$-1.4f < f_1 < -0.5f \quad (3)$$

where f is the focal length of the objective lens, and $f_1$ is the focal length of the first optical unit.

It is further preferable that the objective lens is designed to satisfy the formula:

$$0.5f < f_2 < 0.8f \quad (4)$$

where f is the focal length of the objective lens, and $f_2$ is the focal length of the second optical unit.

It is further preferable that the objective lens is designed to satisfy the formula:

$$d_0 > 0 \quad (5)$$

where $d_0$ is the distance between the reflection point on the rotation mirror and the incident surface of the first optical unit.

Practically, it is preferable that the deflection means comprises either a rotation mirror reciprocatingly rotating in the forward and reverse directions or a multifaced polygonal mirror rotating only in one direction.

According to a preferred embodiment of the invention, it is preferable that collimator means for collimating the scanning beam impinging upon the deflection means is placed optically before the deflection means.

Preferably, sensor means is further provided to the optical system in order to detect the current position of the scanning spot on the recording medium. In the case where the rotation mirror reciprocatingly rotating in forward and reverse directions, a reference beam is directed to impinge upon the rotation mirror, and to advance through the objective lens to the sensor means, whereby the reference beam scans the sensor means synchronously with the movement of the scanning beam. The sensor means preferably comprises a grating sensor, which includes a grating bearing transparent strips and opaque strips one after another thereon and photoelectric elements disposed behind the grating. Practically, it is preferable that the reference beam is divided by a half-mirror from the scanning beam emitted from the light source.

According to an embodiment of the present invention, beam dividing means for dividing the beam emitted from the light source into a plurality of scanning beams is placed optically between the light source and the deflection means, the recording medium being scanned by the scanning beams. In this case, the modulator means preferably comprises an optical modulator, which is disposed immediately after the beam dividing means, while the optical modulator means modulating the scanning means individually.

Having the aforementioned features, the present invention has the following useful advantages:

The optical system according to the present invention is extensively adaptable for recording an image on a recording medium by using a so-called flying-spot scanning apparatus.

A scanning locus or loci made by the optical system can be corrected to be straight without any scan-line bow, whereby the fidelity of reproduction of an image can be secured satisfactorily.

Particularly in the case where a plurality of the scanning beams are used for recording, even if a scanning beam or beams having declination with respect to the deflection plane, all scanning loci on a recording medium can be straight in parallel to each other, whereby respective intervals between the adjacent scanning loci can be constant and uniform throughout the whole surface of the recording medium.

Where the diameter of the scanning spot is considerably reduced in order to increase the resolution power, a plurality of scanning spots can be employed, whereby the time necessary for reproduction of an image can be extensively reduced.

Other novel features and advantages of the present invention will become apparent in the course of the following detailed description taken together with the accompanying drawings, which are directed only to the understanding of the present invention and not to the restriction of the scope of the invention.

BRIEF DESCRIPTION OF THE DRAWINGS

FIGS. 1-(A) and 1-(B) are diagrams showing scanning loci made by an optical system according to the present invention and those made by a conventional optical system, respectively;

FIG. 2-(A) is a schematic side view of a first embodiment of the optical system according to the present invention;

FIG. 2-(B) is an elevational view of a part of a grating sensor;

FIG. 9 is a schematic side view of a converging optical system to be used in the fourth embodiment;

FIG. 10 is as schematic side view of another converging optical system;

FIGS. 18 through 33 show an example of an f-sine theta lens according to the present invention, respectively, in which the suffix (A) is a side view of the f-sine theta lens, the suffix (B) is a diagram showing the spherical aberration, the suffix (C) is a diagram showing the astigmatism, and the suffix (D) is a diagram showing the distortion.

DETAILED DESCRIPTION OF PREFERRED EMBODIMENTS

Figure 3:
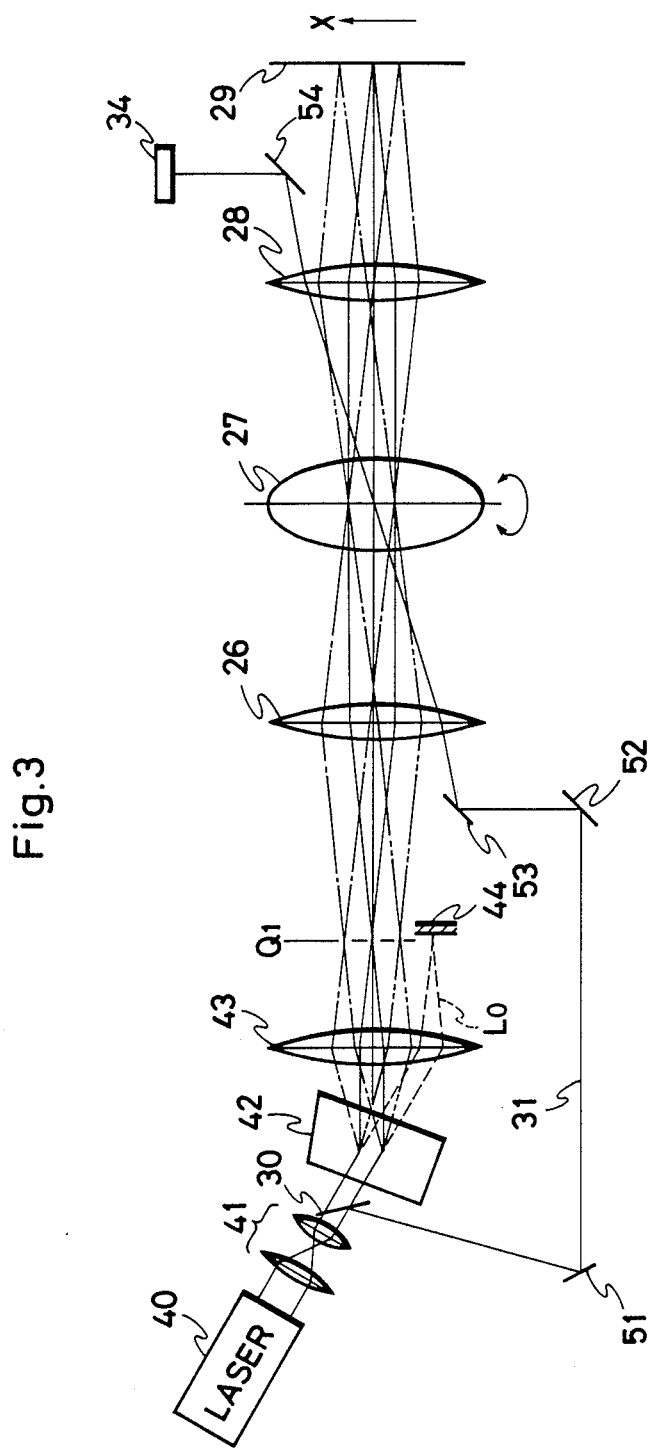
FIG. 3 is a schematic side view of a second embodiment of the optical system according to the invention.

Referring to FIG. 2, which shows a schematic view of a first embodiment of an optical system according to the invention, a laser beam emitted from a light source 11 enters a condenser lens 12. The light emitted from the light source has the beam spreading to such an extent that it cannot be disregarded. A beam splitter (e.g. half-mirror) 30 is disposed along the optical axis of the lens 12, by which the beam is divided into two optical paths, one is for use in a scanning beam and the other is for use in a reference beam.

The beam transmitted through the half-mirror 30 impinges upon a half-mirror 14 and a total reflection mirror 15 in order through a convergent lens 13.

The beam reflected from the mirror 15 is received by a beam dividing device 16. The beam dividing device 16 comprises an optical glass block having plane surfaces that are parallel to each other. The beam obliquely entered into the beam dividing device 16 is reflected by both the surfaces thereof and is divided at every reflection point on the second reflection surface, by which the incident beam is divided into three beams. Beams thus divided emerge from the second surface of the beam dividing device 16 and are received by an acousto-optical modulator 17 (hereinafter referred to as AOM). The AOM 17 is designed for three channels and is placed immediately after the beam dividing device 16.

The respective beams are individually modulated by the AOM 17 on the basis of image signals of a desired original to be recorded.

On the other hand, the beam reflected by the half-mirror 14 enters another beam dividing device 19 through a total reflection mirror 18. The beam dividing device 19 is substantially the same in construction, and functions substantially in the same manner as the device 16. The beam dividing device 19 divides the incident beam into two beams. Another AOM 20 for two channels is disposed immediately after the beam dividing device 19, by which the respective beams thus divided are modulated individually.

Beams emerged from both the AOMs 17 and 20 are aligned one another by a half-mirror 21 and are directed to a collimater lens 22. In this instance, optical elements are designed so that the respective beams emerged from the AOM 20 impinge upon the half-mirror 21, and that the respective incident positions of the beams are to be approximately in the middle of adjacent beams emerged from the AOM 17.

Merely by way of easiness of illustration, explanation is given in the case where the laser beam splitted by the half-mirror 14 is further divided into three beams and the AOM 17 for three channels is employed, while the other laser beam splitted by the half-mirror 14 is in turn divided into two beams and the AOM 20 for two channels is employed. Practically, it will be preferable to employ a pair of beam dividing devices for ten channels instead of the devices 16 and 19, and to provide ten-channel AOMs instead of the AOMs 17 and 20.

The beams emerged from the collimator lens 22 advance through a folding mirror 23 and a convergent lens 24, to form spot images at a focal plane $Q_1$ of the convergent lens 24. Then, these beams advance through a collimater lens 26 having a focal length of e.g. 800 mm to impinge upon a surface of a deflecting mirror 27, deflection of which is to and fro, with forward and reverse strokes. To avoid unnecessary complexness of illustration, all the beams from the AOM 20 are omitted after the collimater lens 22, and only three beams from the AOM 17 are illustrated by thick lines, one-dot lines and two-dot lines, respectively.

Deflection of the deflecting mirror 27 is controlled by a galvanometer (not shown) at a predetermined ratio corresponding to a desired scanning speed. The beams deflected are focused, through an f-sine theta lens 28 having a focal length of e.g. 800 mm, on a recording medium 29 disposed optically after the lens 28. As the deflecting mirror 27 rotates in the forward and reverse directions, recording spots thus focused scan the recording medium 29, while the recording medium 29 is fed at a predetermined speed in a direction X perpendicular to the scanning direction.

The recording spots focused on the recording medium 29 are aligned at intervals of e.g. 12.5 μm in the direction X, whereby five scanning lines are recorded during a forward or reverse stroke of the beams. Feeding speed of the recording medium 29 is determined on the basis of both the scanning cycle and the scanning length on the recording medium.

In order to detect the current position of the scanning spots on the recording medium, a reference beam 31 is divided by the half-mirror 30, which impinges upon the surface of the deflecting mirror 27 through a folding mirror 32. The reference beam advances a different optical path from the beams for scanning, as can be typically seen in FIG. 2-(A). The reference beam deflected by the deflecting mirror 27 scans a grating sensor 34 through the f-sine theta lens 28 and a folding mirror 33, whereby timing pulse signals are generated synchronously with scanning of the recording medium.

The grating sensor 34 comprises a grating bearing transparent strips and opaque strips one after another thereon and photoelectric elements disposed behind the grating, as shown in FIG. 2-(B). A timing pulse signal is generated when the reference beam traversing the grating impinges upon a transparent strip of the grating.

Intervals of the pulse signals generated from the grating sensor 34 are appropriately multiplied or divided to be applied to both the AOMs 17 and 20, whereby controlling the AOMs on the basis of image signals of a desired original. Since conventional methods can be applied to such timing control, further detailed explanation is omitted here.

In this embodiment an f-sine theta lens 27 is used as an objective lens. Due to the employment of such f-sine theta lens, even when a plurality of scanning beams are used, all scanning loci of scanning spots will come into straight. Accordingly, as shown in FIG. 1-(A), all the scanning loci on the recording medium will result in straight and run in parallel to each other.

SECOND EMBODIMENT

Referring now to FIG. 3 which shows a schematic view of a second embodiment of an optical system according to the invention, a laser beam emitted from a light source 40 advances to a half-mirror 30 through a beam compressor 41 and is divided into two optical paths by the half-mirror 30. The light source 40 comprises a He-Ne laser tube, the light emitted from which has the beam spreading to such an extent that it can be disregarded. Accordingly, the beam is treated as a parallel bundle of rays.

The diameter of the laser beam is reduced up to a value by the beam compressor 41. A beam transmitted through the half-mirror 30 is received by an AOM 12. The beam is divided into e.g. three beams by applying ultrasonic-wave signals synthesized from e.g. three different kinds of ultrasonic-wave signals.

Figure 4:
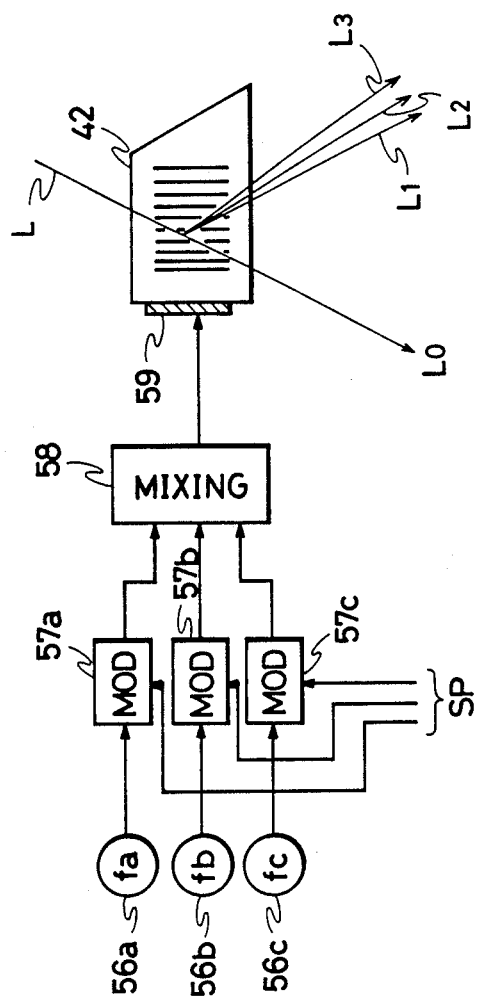
FIG. 4 shows a circuit for applying synthesized ultrasonic-waves to an acousto-optical modulator.

FIG. 4 shows a circuit for applying the synthesized ultrasonic-wave signals to the AOM 42. Three different kinds of ultrasonic-wave signals fa, fb and fc are generated by ultrasonic-wave oscillators 56a, 56b and 56c. The relationship among the frequencies of the signals fa, fb and fc is given as follows:

$$fa = fb - \Delta f \qquad (6)$$

$$fc = fb + \Delta f \qquad (7)$$

where $\Delta f$ is a constant.

These ultrasonic-wave signals are inputted to modulators 57a, 57b and 57c, where the signals are subjected to ON-OFF control or amplitude modulation on the basis of image signals $S_p$ applied to the modulators. Then the signals controlled or modulated are inputted to a mixing circuit 58, respectively, and are synthesized therein. These signals thus synthesized are high-frequency signals having three different frequency ingredients, which are applied to a transducer 59 of the AOM 42. In response to application of these signals, compressional stational waves having pitches corresponding to the frequency ingredients of the ultrasonic-wave signals are formed within the AOM 42.

When a beam L enters the AOM 42, the beam L is divided into two kinds of beams, i.e. one is a beam of zero-order diffraction $L_0$ and the other is three beams of first-order diffraction $L_1$, $L_2$ and $L_3$ which form deflection angles corresponding to the frequency ingredients.

Returning back to FIG. 3, a convergent lens 43 is placed at the distance of 20 mm away from the AOM 42, while the focal length of the lens 22 is also 20 mm. Accordingly, spot images are focused on the secondary focal plane $Q_1$. Respective rays of the beams are shown by thick lines, one-dot lines and two-dot lines.

The beam of the zero-order diffraction shown by broken lines is blocked by a stop 44, while the beams of the first-order diffraction advance to enter a collimater lens 26 and to impinge upon a deflecting mirror 27.

The beams deflected by the deflecting mirror 27 are focused, by the f-sine theta lens 28, on the recording medium 29 disposed optically after the lens 28. As the deflecting mirror 27 rotates in the forward and reverse directions, recording spots scan the recording medium 29, while the recording medium 29 is fed at a predetermined speed in a direction X perpendicular to the scanning direction.

Since intervals between the adjacent beams at the plane $Q_1$ are determined by deflection angles formed by the beams in the AOM 42, which is determined in turn by the frequencies of the ultrasonic-wave signals applied to the AOM 42, beam intervals on the plane $Q_1$ and scanning line intervals on the recording medium 29 can be controlled by appropriately selecting frequencies of the oscillators 56a, 56b and 56c. For example, assuming that the diameter of the respective beams is 1.29 mm both at AOM 42 and on the lens 43, the beam diameter thereof will be 51.6 mm on both the collimater lens 56 and the f-sine theta lens 28, and hence the diameter of the respective scanning spots will result in 12.5 $\mu$m on the recording medium 29. When the interval on the plane $Q_1$ between the adjacent beams is 12.5 $\mu$m, the interval on the recording medium 29 therebetween will also be 12.5 $\mu$m, assuming that the angle formed between the adjacent beams deflected by the AOM 42 is controlled to be $6.25 \times 10^{-4}$ radian.

Accordingly, the scanning spots on the recording medium 29 are aligned at intervals of e.g. 12.5 $\mu$m in the direction X, whereby three scanning lines are recorded during a forward or reverse stroke of the beams.

The feeding speed of the recording medium 29 is determined on the basis of both the scanning cycle and the scanning length on the recording medium.

In order to detect the current position of the scanning spots on the recording medium, the reference beam 31 is divided by the half-mirror 30 substantially in the same manner as the first embodiment shown in FIG. 2-(A). The reference beam advances, through mirrors 51, 52, 53, the collimater lens 26, the deflecting mirror 27, the f-sine theta lens 28 and a mirror 54, in order, to the grating sensor 34.

All the scanning loci of the beams are secured to be straight and in parallel to each other on the recording medium 29 substantially in the same manner in the first embodiment shown in FIG. 2-(A).

THIRD EMBODIMENT

Figure 5:
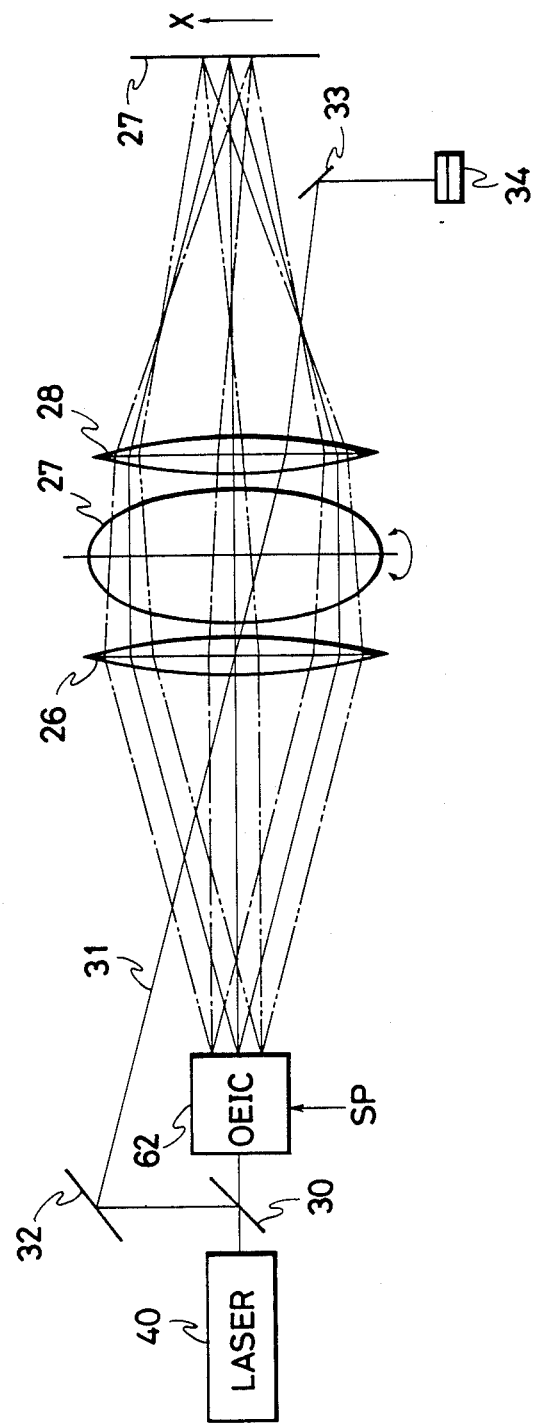
FIG. 5 is a schematic side view of a third embodiment of the optical system according to the invention.

Referring to FIG. 5, which shows a schematic view of a third embodiment of an optical system according to the invention, a laser beam emitted from the laser tube 40 is received by an optoelectronic integrated circuit (hereinafter referred to as OEIC) 62 through the half-mirror 30.

Figure 6:
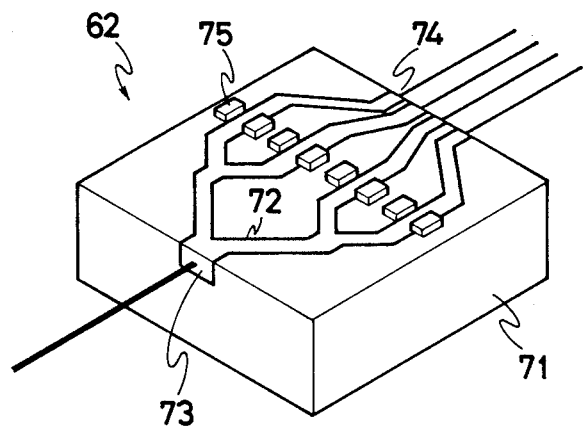
FIG. 6 is a perspective view of an optoelectronic integrated circuit.

FIG. 6 shows a schematic perspective view of the OEIC 62, wherein optical waveguides 72 are provided on a substrate 71. The optical waveguides 72 are formed in such a tree-structure as they are divided in order from an incident port 73 to an exit port 74. Electro-optic modulators (hereinafter referred to as EOMs) 75 are mounted on the optical waveguides 72. The beam emerged from the exit port 74 of the OEIC 62 are subjected to ON-OFF control by inputting desired control signals to the EOMs 75. Since such OEIC is known in the art, detailed explanation thereon is omitted here.

Returning back to FIG. 5, the beams divided and modulated by the OEIC 62 are received and collimated by a collimater lens 26, to impinge upon the surface of the deflecting mirror 27. Then, the beams are deflected substantially in the same manner as in the first and second embodiments.

The beams thus deflected enter the f-sine theta lens 28, by which the beams are focused on the recording medium 29 to form scanning spots aligned in the direction X. The scanning spots scans the recording medium in the direction perpendicular to the direction X, while the recording medium 29 is fed at a predetermined speed in the direction X.

In this embodiment, a desired image is recorded on the recording medium 29 by controlling the EOMs 75 on the basis of image signals of a desired original. Modulation or ON-OFF control of the respective beams is made with reference to the current position of the scanning spots on the recording medium.

In order to detect the current position of the scanning spots, the reference beam 31 is divided by the half-mirror 30, which is brought, through a mirror 32, the collimater lens 26, the deflecting mirror 27, the f-sine theta lens 28 and a mirror 33, to the grating sensor 34 substantially in the same manner as in the first and second embodiments.

Figure 7:
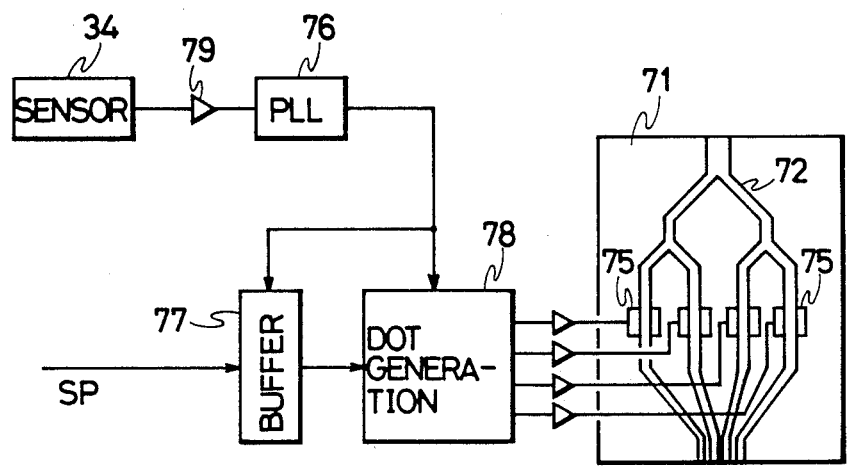
FIG. 7 is a schematic block diagram of a circuit for generating control signals.

Referring to FIG. 7, there is shown an example of a circuit for generating control signals to be applied to the EOMs 75 on the basis of both image signals $S_p$ of a desired original and pulse signals outputted from the grating sensor 34.

Pulse signals outputted from the grating sensor 34 are first inputted, through an amplifier 79, into a phase-locked loop (hereinafter referred to as PLL) circuit 76, by which the signals are converted into high-frequency pulse signals, which are then inputted into a buffer memory 77 and a dot generator 78, respectively.

Image signals $S_p$ of a desired original stored in the buffer memory 77 are read out therefrom and are transmitted to the dot generator 78, on the basis of the timing signals outputted from the grating sensor 34 synchronously with the scanning cycle of the scanning spots.

The dot generator determines whether an exposure onto the recording medium 29 is made at the current position of the scanning spots, on the basis of both the image signals $S_p$ and the timing signals, and outputs control signals to the respective EOMs 75, by which the respective optical waveguides 72 are controlled to open or close. In such a manner as above, the respective scanning beams are subjected to ON-OFF control individually, whereby a desired halftone image is recorded on the recording medium.

Since the dot generator is well known in the art, further detailed explanation on construction and operation thereof is omitted here.

FOURTH EMBODIMENT

Figure 8:
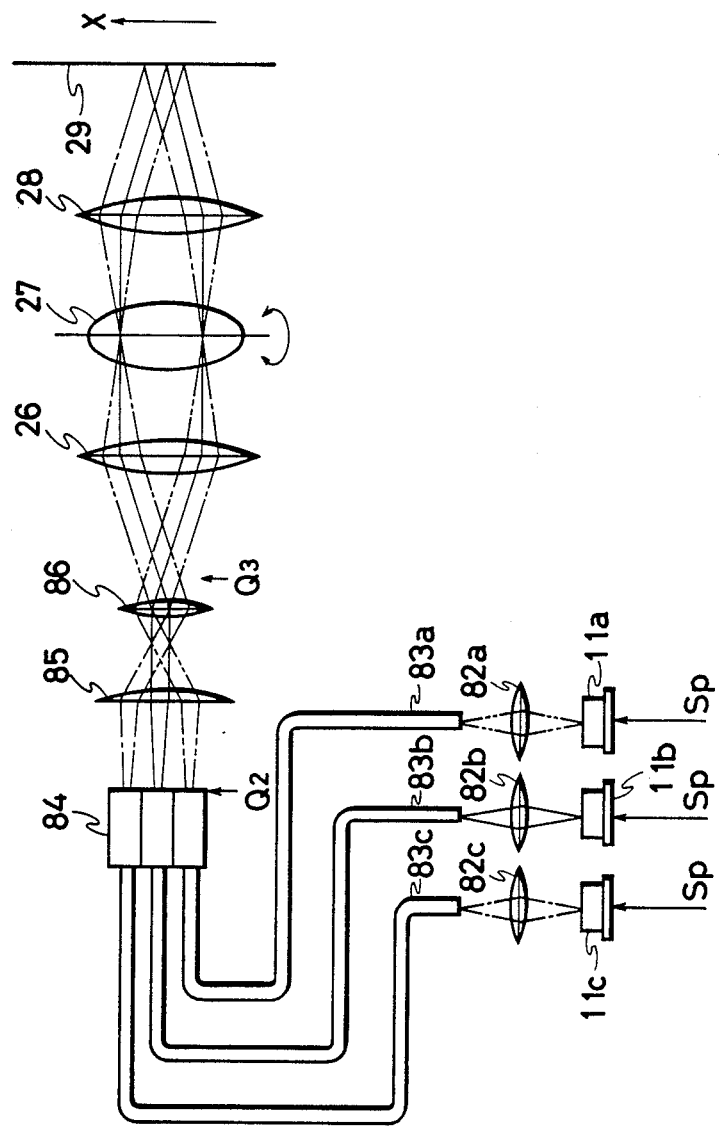
FIG. 8 is a schematic side view of a fourth embodiment of the optical system according to the invention.

Referring to FIG. 8, which shows a schematic view of a fourth embodiment of an optical system according to the invention, a plurality of semiconductor-laser sources 11a, 11b and 11c emit laser beams, which are modulated on the basis of image signals Sp applied to the sources.

The respective laser beams are converged by converging lenses 82a, 82b and 82c on an incident terminal of optical fibers 83a, 83b and 83c, the laser beams being conducted to the exit terminal of the fibers therethrough.

At the respective exit terminals of the optical fibers, a convergent optical system 84 is mounted, so that approximately parallel beams emerge from the exit terminal $Q_2$ of the convergent optical system. The interval between the adjacent scanning beams is effected to be 0.5 mm on the plane $Q_2$.

The beams emerged from the convergent optical system are focused on a focal plane $Q_3$ by an image-formation optical system comprised of a pair of converging lenses 85 having the focal length of 800 mm and 86 having the focal length of 20 mm. The interval between the adjacent scanning beams is effected to be 12.5 μm on the plane $Q_3$, while the diameter of the respective beams is effected to be 1.29 mm on the incident surface of the lens 85. Then, the beams are received by a collimater lens 26 having the focal length of 800 mm and are collimated thereby. The diameter of the respective beams is 51.6 mm on the incident surface of the collimater lens 26. The collimater lens 26 is placed at a distance of 800 mm away from the plane $Q_3$, while the focal length of the collimater lens 26 is also 800 mm. The beams thus collimated impinge upon the deflecting mirror 27.

Substantially in the same manner as in the preceding embodiments, deflection of the deflecting mirror 27 is controlled by a galvanometer (not shown) at a predetermined ratio corresponding to a desired scanning speed. The beams deflected are focused, by the f-sine theta lens 28 having the focal length of 800 mm, on the recording medium 29 disposed optically after the lens 28. The diameter of the respective beams is effected to be 51.6 mm on the incident surface of the f-sine theta lens 28. As the deflecting mirror rotates in the forward and reverse directions, scanning spots scan the recording medium 29, while the recording medium 29 is fed at a predetermined speed in the direction X perpendicular to the scanning direction. Consequently, both the diameter of the respective beams and the interval therebetween will result in 12.5 μm on the recording medium.

Referring now to FIG. 9, there is shown a converging optical system 84 to be mounted at the exit terminal of the optical fiber 83. The converging optical system 84 comprises an array of distributed index lenses in the form of rods (hereinafter referred to as rod lenses), which is supplied to the market as "SELFOC TM microlens". The diameter of the respective rod lenses is designed to be 0.5 mm, and intervals between the adjacent rod lenses are 0.25 mm.

When the beams are converged on the incident terminals of the optical fibers, the beams advance through the fibers to enter the convergent optical system. The beams reflect at a constant reflection cycle within the rod lenses to advance toward the exit terminals thereof. Approximately parallel beams will emerge from the exit terminals of the rod lenses 91, in the case where the length of the rod lenses is designed so as to be 0.25 times of the reflection cycle, assuming that a secondary point source is formed at the incident surface of the rod lens. Practically, since the beam entering the incident surface of the rod lens 91 has a diameter corresponding to the diameter of the optical fiber 83, beams having slightly divergent bundle of rays will emerge from the exit terminal of the rod lens 91, which can be regarded as parallel rays.

Since supplied to the market are such various kinds of rod lenses as having a fine diameter of ½ mm to ⅓ mm, intervals between the adjacent scanning spots focused on the recording medium 29 can be adjusted by selecting the rod lens to be used.

From the aforementioned explanation, both the diameter of respective scanning spots on the recording medium 29 and the intervals between the adjacent scanning spots are 12.5 μm, which satisfies the conditions for image reproduction with high resolution.

Referring to FIG. 10, which is another embodiment of the converging optical system 84, a convergent lens 92 is located at a distance of the focal length thereof from the exit terminal of the optical fiber 83, so that approximately parallel beams emerge from the converging lens 92.

Figure 11:
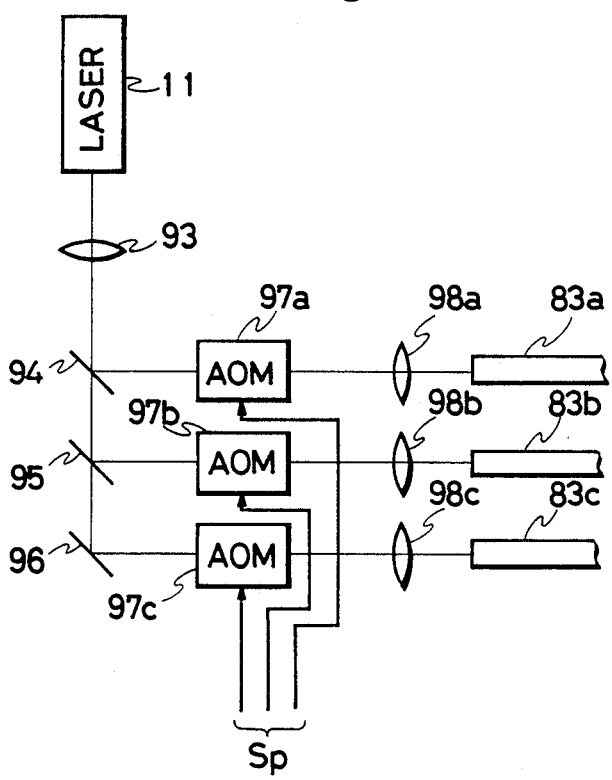
FIG. 11 is a schematic side view of a modified embodiment of the fourth embodiment.

FIG. 11 shows a modified embodiment of the embodiment shown in FIG. 8, in which a single light source 11 is employed in lieu of a plurality of the semiconductor-laser sources, and a single laser beam emitted from therefrom is transmitted through a convergent lens 93 and is divided by a pair of half-mirrors 94 and 95 and a total reflection mirror 96, which are aligned along the optical axis. The respective beams thus divided are subjected to modulation by AOMs 97a, 97b and 97c on the basis of image signals $S_p$ of a desired original. The beams thus modulated are received by incident terminals of optical fibers 83a, 83b and 83c through convergent lenses 98a, 98b and 98c.

In this case, the incident terminals of the optical fibers 83a, 83b and 83c can be disposed at the intervals adaptable for installation of the AOMs 97a, 97b and 97c, while the exit terminals thereof can be arranged at the reduced intervals adaptable for high resolution reproduction. All the elements to be employed in the construction after the optical fibers may be the same as illustrated in FIG. 8, and accordingly a further explanation is omitted with respect to the modified embodiment.

FIFTH EMBODIMENT

In the preceding embodiments, a plurality of scanning spots are employed for scanning a recording medium. However, it may also be possible to use a single laser beam which is deflected with higher cycles in the direction X than the scanning cycle effected by the deflecting mirror 27.

Figure 12:
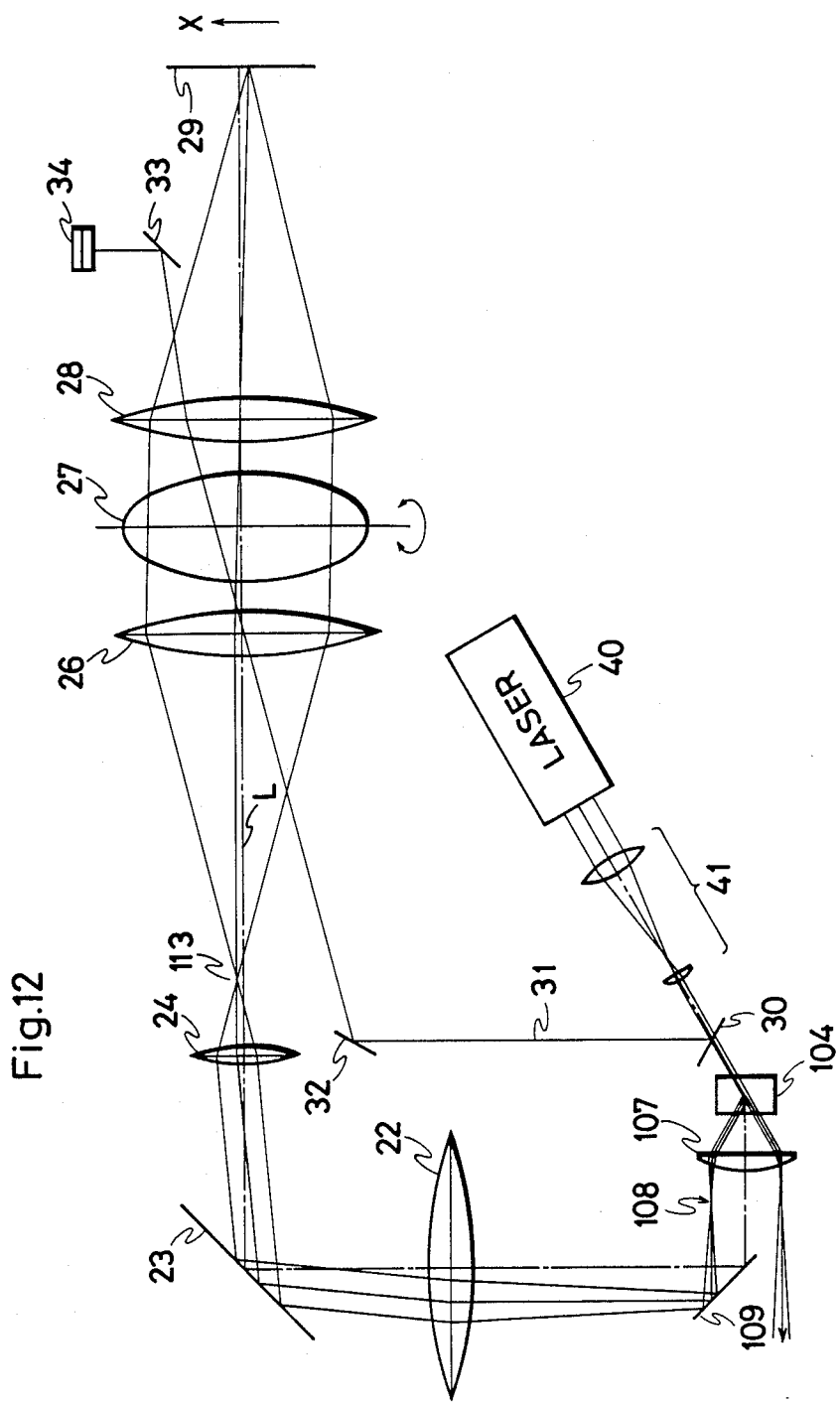
FIG. 12 is a schematic side view of a fifth embodiment of the optical system according to the invention.

Referring to FIG. 12, a single laser beam emitted from the laser tube 40 is received by a beam compressor 41 comprised of a pair of convergent lenses, by which the diameter of the beam is reduced up to a desired diameter. The beam is then divided into two optical paths by the half-mirror 30, one of which is transmitted therethrough and the other is reflected thereby.

The beam transmitted is received by an AOM 104 and is subjected to the modulation therein, by which the beam is deflected up to the angle corresponding to the ultrasonic-wave frequency applied to the AOM 104.

A convergent lens 107 is disposed at the distance of the focal length thereof away from the deflecting point of the AOM 104, by which the beams advance in parallel with the optical axis. An intermediate point image is formed at a point 108 by the convergent lens 107.

Then, the beam is reflected by a mirror 109 and is received by the collimater lens 22, by which the beam is collimated. The beam then advance via the folding mirror 23, to enter the convergent lens 24. The beam is focused by the convergent lens 24, to form a further intermediate point image at a point 113.

Further, the beam is collimated again by the collimater lens 26 to impinge upon the surface of the deflecting mirror 27, by which the beam is directed toward the recording medium, through the f-sine theta lens 28, substantially in the same manner as the preceding embodiments.

The beam deflected is focused upon the recording medium 29, which scans thereon as the deflecting mirror rotates in the forward and reverse directions.

The reference beam 31 reflected by the half-mirror 30 is conducted to the collimater lens 26 through the total reflection mirror 32, then the beam impinge upon the deflecting mirror 27 through the collimator lens 26. The reference beam is then deflected by the deflecting mirror 27 synchronously with the rotation of the deflecting mirror. The beam deflected then scans the grating sensor 34 through the f-sine theta lens 28 and the mirror 33, to generate the timing pulses.

The scanning beam entering the deflecting mirror 27 is slightly inclined relative to the optical axis as shown in FIG. 12, and the angle formed between the beam and the optical axis depends on the distance between the optical axis and the position where the beam impinges upon the lens 22. Such distance is in turn determined by the deflection angle caused by the AOM 41.

It can be understood that the distance between a position of the scanning spot and the optical axis on the recording medium 29 will be varied as the angle formed between the scanning beam and the optical axis changes, therefore, the position of the scanning spot on the recording material 29 can be controlled in the vertical direction X by appropriately adjusting the carrier-frequency applied to the AOM 104.

Figure 13:
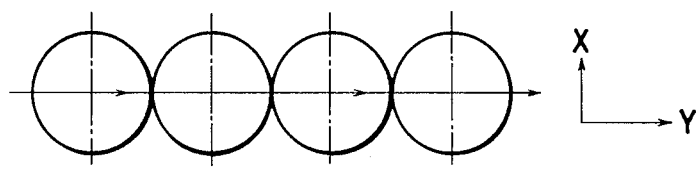
FIG. 13 is a diagram showing a scanning locus made by a single scanning spot.
Figure 14:
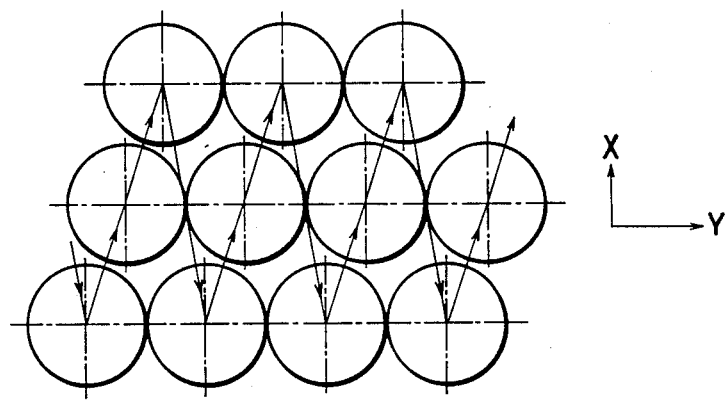
FIGS. 14 and 15 are diagrams showing scanning loci made by a single scanning spot.
Figure 15:
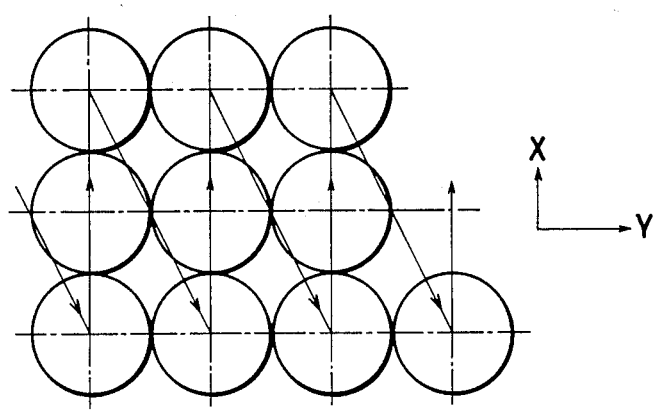

A scanning locus made by a single scanning spot is shown in FIG. 13, from which it will be apparent that the single scanning spot runs along a single scanning line. However, it is applicable to the case where a single scanning beam is employed that, as shown in FIGS. 14 and 15, a plurality of scanning lines are scanned during one scanning operation by deflecting the scanning beam in the X-direction at a considerably higher frequency than the scanning cycle in the Y-direction. The deflection of the scanning beam in the X-direction is controlled by appropriately adjusting the carrier-frequency applied to the AOM 104.

According to this embodiment, all scanning loci of the respective scanning lines are made parallel to each other in the same manner as shown in preceding embodiments, due to the application of the f-sine theta lens.

The preceding embodiments are directed to image recording by employment of a plurality of scanning beams, while this embodiment is applicable to both the recording on a recording medium and the reading of an original to be reproduced for obtaining image signals.

In the case where this embodiment is used for the reading of an original to be reproduced, the original is placed in lieu of the recording medium, which is scanned by a single scanning spot. Then, the light reflected or transmitted from the original is received by a photoelectric conversion element (not shown), to generate image signals.

In all the preceding embodiments, the deflecting mirror reciprocatingly rotating in the forward and reverse directions is employed as a means for deflecting the scanning beam or beams, however, it is not restricted to such deflecting mirror. For example, a multifaced polygonal mirror may be used instead, as such deflection means.

Further, in all the preceding embodiments, the parallel straight scanning loci on a recording medium are effected by application of the f-sine theta lens as an objective lens.

Figure 16:
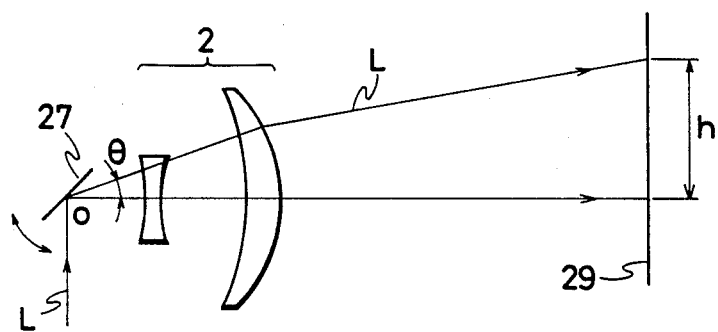
FIG. 16 is a plane view of a part or a flying-spot scanning system.

Now, hereinafter is described the reason why the scanning loci are made straight and parallel to each other. FIG. 16 shows a schematic illustration of a flying-spot scanning apparatus employed with a galvanometer-mirror as a beam deflecting mirror.

A light beam L impinging upon the center of a deflecting mirror 27 is deflected thereby and moves as forward and reverse strokes. The beam is then focused on a recording medium 29 by an objective lens 2, and accordingly a scanning spot scans the recording medium 29 as the deflecting mirror rotates.

In the case where an f-theta lens, which has commonly been used as an objective lens in so-called flying-spot scanning apparatus, is used in such an apparatus as shown in FIG. 16, it represents a characteristic of:

$$h = f \cdot \theta \tag{8}$$

where f is a focal length of the objective lens, $\theta$ is an angle (radian) that the beam forms with respect to the optical axis, and h is a distance between the optical axis and a point that the beam impinges upon.

Such application of the f-theta lens has been generally made in a conventional flying-spot scanning apparatus. However, the scanning locus of the beam running outside the "deflection plane" cannot be made straight, the reason of which is discussed hereinafter.

Figure 17:
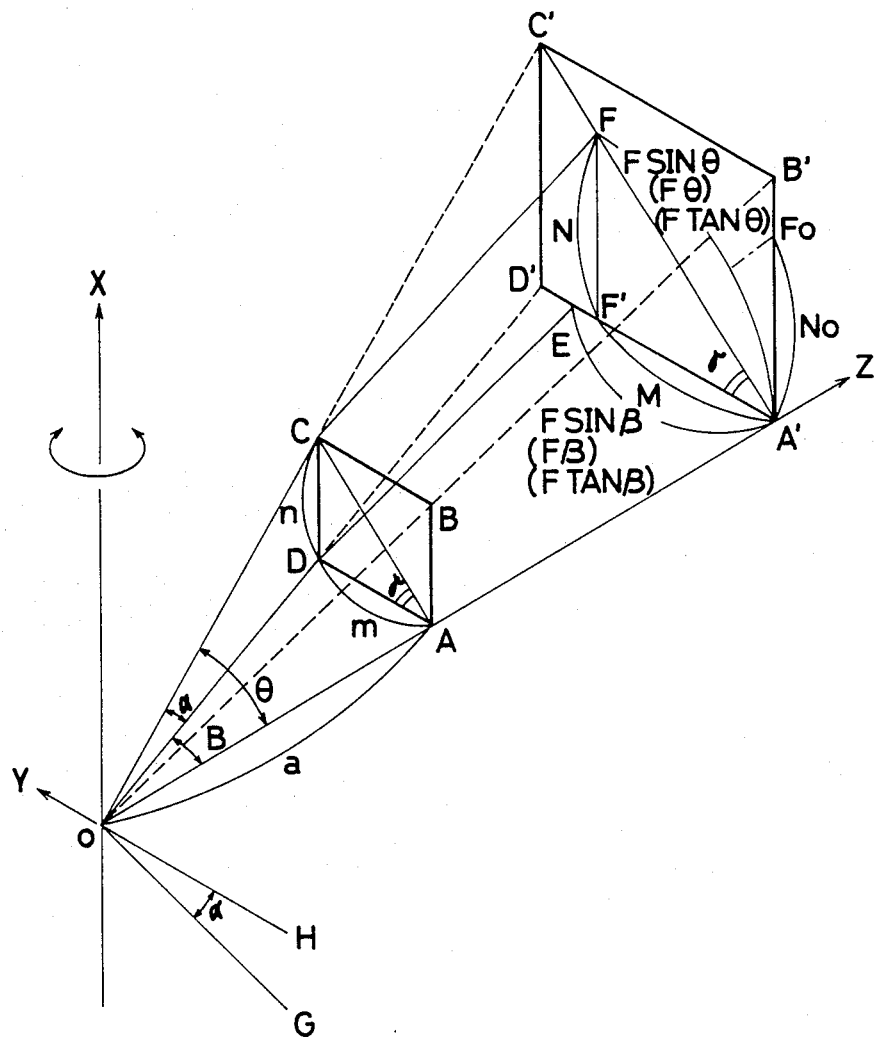
FIG. 17 is a schematic illustration of optical paths effected by a deflection mirror.

FIG. 17 shows a schematic illustration of the optical path effected by the deflecting mirror. The rotational axis of the deflecting mirror 27 exactly corresponds to the X-axis of the coordination system, around which the deflecting mirror rotates in the forward and reverse directions, while the optical axis of the objective lens exactly corresponds to the Z-axis.

A quadrilateral ABCD represents a part of a principal plane of the objective lens, and a quadrilateral A'B'C'D' represents a part of the recording medium to be scanned thereon. These two quadrilaterals stand perpendicular to the optical axis (i.e. the Z-axis) and are similar to each other. A scanning spot effected by stroke of a scanning beam runs in parallel to the Y-direction, and all points O, A, A', D, D', E, F' and H locate on the "deflection plane", i.e. Y-Z plane.

A line H-O-D-E represents a first light beam which impinges upon the point O of the deflection mirror and is reflected thereby along the Y-Z plane to strike at the point E. A line G-O-C-F represents a second light beam which impinges upon the point O of the deflection mirror with an angle $\alpha$ with respect to the Y-Z plane, and which is reflected thereby to strike at the point F. The point F' is an intersection of both the vertical line through the point F and the line A'-D'.

Now, provided that $\beta$ is an angle between the first light beam and the optical axis, that $\theta$ is an angle between the second light beam and the optical axis, that $\gamma$ is an angle between the diagonal line of the the quadrilaterals ABCD and A'B'C'D', respectively, and Y-Z plane, that m is a distance between the points A and D, that n is a distance between the points C and D, that M is a distance between the points A' and F', that N is a distance between the points F and F', and that a is a distance between the points O and A, such relationships will be established as follows:

$$\tan \alpha = \frac{n \cos \beta}{a} \quad (9)$$

$$\tan \beta = \frac{m}{a} \quad (10)$$

$$\tan \theta = \frac{\sqrt{m^2 + n^2}}{a} \quad (11)$$

$$\tan \gamma = \frac{n}{m} \quad (12)$$

In the case where the f-theta lens is used as the objective lens, the distance between the points A' and F will result in fθ due to the characteristic of the f-theta lens, and accordingly the following equations are obtained:

$$M = f\theta \cos \gamma \quad (13)$$

$$N = f\theta \sin \gamma \quad (14)$$

Then, by obtaining n and m from the equations (9) and (10) and substituting these for the equation (12), the equations (13) and (14) are modified as follows:

$$\tan \gamma = \frac{\tan \alpha}{\sin \beta} \quad (15)$$

$$M = f\left(\tan^{-1}\sqrt{\frac{\tan^2 \alpha}{\cos^2 \beta} + \tan^2 \beta}\right) \cdot \cos\left(\tan^{-1}\frac{\tan \alpha}{\sin \beta}\right) \quad (16)$$

$$N = f\left(\tan^{-1}\sqrt{\frac{\tan^2 \alpha}{\cos^2 \beta} + \tan^2 \beta}\right) \cdot \sin\left(\tan^{-1}\frac{\tan \alpha}{\sin \beta}\right) \quad (17)$$

Hereinafter shown are some results when specific values are applied to the aforementioned equations, where $N_O$ represents the value of N when $\beta = 0$.

(A) In the case where f=800 (mm) and α=6.55 (sec.):

TABLE 1

| β (deg.) | M (mm) | M-fβ (μm) | N (μm) | N-N$_o$ |
|---|---|---|---|---|
| 0 | 0 | 0 | 25.404 | 0 |
| 5 | 69.8 | −2.3 × 10$^{-5}$ | 25.437 | 0.032 |
| 8 | 111.7 | −3.8 × 10$^{-5}$ | 25.487 | 0.083 |
| 10 | 139.6 | −4.7 × 10$^{-5}$ | 25.534 | 0.129 |
| 12 | 167.6 | −5.7 × 10$^{-5}$ | 25.591 | 0.187 |
| 15 | 209.4 | −7.1 × 10$^{-5}$ | 25.697 | 0.293 |

(B) In the case where f=800 (mm) and α=3.27 (sec.):

TABLE 2

| β (deg.) | M (mm) | M-fβ (μm) | N (μm) | N-N$_o$ |
|---|---|---|---|---|
| 0 | 0 | 0 | 12.683 | 0 |
| 5 | 69.8 | −1.2 × 10$^{-5}$ | 12.699 | 0.016 |
| 8 | 111.7 | −1.9 × 10$^{-5}$ | 12.724 | 0.041 |
| 10 | 139.6 | −2.4 × 10$^{-5}$ | 12.747 | 0.065 |
| 12 | 167.6 | −2.9 × 10$^{-5}$ | 12.776 | 0.093 |

TABLE 2-continued

| β (deg.) | M (mm) | M-fβ (μm) | N (μm) | N-N$_o$ |
|---|---|---|---|---|
| 15 | 209.4 | −3.6 × 10$^{-5}$ | 12.829 | 0.146 |

(C) In the case where f=800 (mm) and α=122.47 (sec.)

TABLE 3

| β (deg.) | M (mm) | M-fβ (μm) | N (μm) | N-N$_o$ |
|---|---|---|---|---|
| 0 | 0 | 0 | 475.00 | 0 |
| 5 | 69.8 | −8.2 × 10$^{-3}$ | 475.60 | 0.60 |
| 8 | 111.7 | −1.3 × 10$^{-2}$ | 476.54 | 1.55 |
| 10 | 139.6 | −1.7 × 10$^{-2}$ | 477.42 | 2.42 |
| 12 | 167.6 | −2.0 × 10$^{-2}$ | 478.49 | 3.49 |
| 15 | 209.4 | −2.5 × 10$^{-2}$ | 480.47 | 5.47 |

From the aforementioned tables, it will be understood that the locus effected by the light beam entering the objective lens with an angle with respect to the optical axis will not be straight, but will be formed into a scan-line bow. Such scan-line bow will inherently raise in the case where a plurality of scanning beams are employed.

According to the present invention, such scan-line bow is resolved by application of the f-sine theta lens having the characteristic that a distance h on the recording medium between the point upon which a scanning beam impinges and the optical axis is proportional to the sine of the angle θ between the scanning beam and the optical axis.

Now, referring to FIG. 17 again, discussion is made in the case where the f-sine theta lens is used in lieu of the f-theta lens.

Since the distance between the points A' and F is f·sin θ due to the characteristic of the f-sine theta lens, the following equations will be established:

$$M = f \cdot \sin \theta \cdot \cos \gamma \quad (18)$$

$$N = f \cdot \sin \theta \cdot \sin \gamma \quad (19)$$

Then, by obtaining n and m from the equations (9) and (10) and substituting these for the equation (11), $$\tan \theta = \sqrt{\frac{\tan^2 \alpha}{\cos^2 \beta} + \tan^2 \beta} \quad (20)$$

Similarly, by substituting the n and m for the equation (12), $$\tan \gamma = \frac{\tan \alpha}{\tan \beta} \quad (21)$$

Accordingly, $$\sin \theta = \frac{\tan \theta}{\sqrt{\tan^2 \theta + 1}} \quad (22)$$

Then, by substituting the equation (20) for the equation (22), $$\sin \theta = \sqrt{\frac{\tan^2 \alpha + \sin^2 \beta}{\tan^2 \alpha + 1}} \quad (23)$$

$$\cos \gamma = \frac{1}{\sqrt{\tan^2 \gamma + 1}} \qquad (24)$$

Further, by substituting the equation (21) for the equations (23) and (24), $$\cos \gamma = \frac{\sin \beta}{\sqrt{\tan^2 \alpha + \sin^2 \beta}} \qquad (25)$$

$$\sin \gamma = \frac{\tan \alpha}{\sqrt{\tan^2 \alpha + \sin^2 \beta}} \qquad (26)$$

Consequently, $$M = f \cdot \sqrt{\frac{\tan^2 \alpha + \sin^2 \beta}{\tan^2 \alpha + 1}} \cdot \frac{\sin \beta}{\sqrt{\tan^2 \alpha + \sin^2 \beta}} \qquad (27)$$
$$= f \cdot \cos \alpha \cdot \sin \beta$$

$$N = f \cdot \sqrt{\frac{\tan^2 \alpha + \sin^2 \beta}{\tan^2 \alpha + 1}} \cdot \frac{\tan \alpha}{\sqrt{\tan^2 \alpha + \sin^2 \beta}} \qquad (28)$$
$$= f \cdot \sin \alpha$$

Meanwhile, in the case where the deflection angle formed on the Y-Z plane is zero, the second light beam strikes at the point $F_0$ on the vertical line A'-B'. Assuming that a distance between the point $F_0$ and the optical axis is represented by $N_O$, due to the characteristic of the f-sine theta lens, such relationship will be obtained as follows:

$$N_0 = f \sin \alpha \qquad (29)$$

The degree of the scan-line bow of the second light beam will be represented by:

$$N = N_O = f \sin \alpha - f \sin \alpha = 0 \qquad (30)$$

From the aforementioned explanation, it can be understood that the scanning locus will be exactly straight without any scan-line bow, even in the case where the scanning beam forms an angle with respect to the Y-Z plane.

Hereinafter is given a detailed discussion on such f-sine theta lens. Basically, the f-sine theta lens according to the present invention comprises an optical system having such characteristic that the third-order distortion coefficient V be approximately "1".

Generally, in the case where a light beam is focused by a lens, the image height y' is represented by a function of the incident angle $\theta'$ of the beam entering the lens. That is, provided that the focal length f of the lens be normalized: $f = 1$, and that the principal-ray inclination be normalized "$-1$", the image height can be represented by:

$$y' = \sum_{i=0}^{\infty} A_i \cdot (\theta')^i \qquad (31)$$

where $A_i$ is a constant.

Assuming that the third-order distortion coefficient is represented by V, the relationship between the degree of distortion Di (%) and the coefficient V is expressed as follows:

$$Di(\%) = \frac{y^1 - \tan \theta'}{\tan \theta} \times 100 = -50 V \tan^2 \theta' \qquad (32)$$

By substituting the equation (31) for the equation (32) and disregarding the higher terms than the third order, $$A_n + (A_1 - 1)\theta + A_2\theta'^2 + \left(A_3 - \frac{1}{3} + \frac{V}{2}\right)\theta^3 = 0 \qquad (33)$$

In order to satisfy the equation (33) irrespective of the value of $\theta$, the following equations have to be established:

$$A_0 = A_2 = 0 \qquad (34)$$
$$A_1 - 1 = 0$$
$$A_3 - \frac{1}{3} + \frac{V}{2} = 0$$

In the third-order aberration, the realizable image height y' is represented by:

$$y' = \theta + A_3\theta^3 \qquad (35)$$

In the case where the equation (35) is satisfied, the third-order distortion coefficient is represented by:

$$V = 2(\tfrac{1}{3} - A_3) \qquad (36)$$

Since the sin $\theta$ can be expressed by:

$$\sin \theta = \theta - \frac{\theta^3}{6} \qquad (37)$$

the value of $A_3$ in the lens having the characteristic of $y' = \sin \theta$ is obtained from the equation (35) as follows:

$$A_3 = -\frac{1}{6} \qquad (38)$$

By substituting the equation (38) for the equation (36), $$V = 1 \qquad (39)$$

That is, the third-order distortion coefficient V will result in "1".

Indeed, such lens having the characteristic that the ideal focusing point comes into $y = f \sin \theta$ has been known, for example, as the orthographic projection lens or the Fourier transform lens, in which the third-order distortion coefficient is "1". But, it will be impracticable to apply such orthographic projection lens or Fourier transform lens to a flying-spot scanning system as an objective lens. The reason is that a stop is positioned within or optically after the lens system when using such orthographic projection lens or Fourier transform lens, while in a flying-spot scanning system it is necessary to position a deflection mirror (which corresponds to a stop in the orthographic projection lens or Fourier lens) optically before the objective lens.

The f-sine theta lens according to the present invention comprises a first optical unit having a negative focal length and a second optical unit having a positive focal length, the first and second optical units respectively having a primary and a secondary principal point, a distance D between the secondary principal point of the first optical unit and the primary principal point of the second optical unit being represented by:

$$D > 0.18 f \qquad (2)$$

where f is a focal length of the f-sine theta lens.

In the case where the value of D is smaller than 0.18f, the incident height of the principal ray entering the second optical unit will become lower, hence it will be difficult to obtain the characteristic of $y' = f \sin \theta$.

FIGS. 18 through 33 show examples of the f-sine theta lens according to the present invention. The structure of the f-sine theta lens is shown under the suffix (A) annexed to the respective Figures. The spherical aberration is shown under the suffix (B) annexed thereto. The astigmatism is depicted under the suffix (C), in which the tangental surface is shown by a broken line, while the sagittal surface is shown by a thick line. The distortion is represented under the suffix (D), in which the value of distortion is obtained as follows:

$$(\text{Distortion}) = \frac{(\text{image height}) - f \sin \theta}{f \cdot \sin \theta} \times 100 \qquad (40)$$

EXAMPLE 1

Referring to FIG. 18, the first optical unit $OU_1$ and the second optical unit $OU_2$ comprises a single lens, respectively, both the optical units forming the f-sine theta lens 28 shown in the aforementioned embodiments. The focal length of the f-sine theta lens is 100 mm, the F-number is selected F/60, and the view angle is 30 degrees.

TABLE 4

|   | r (mm)   | d (mm) | n       |
|---|----------|--------|---------|
| 0 |          | 11.667 |         |
| 1 | 230.748  | 2.793  | 1.50839 |
| 2 | 52.498   | 16.667 |         |
| 3 | 181.741  | 5.776  | 1.79883 |
| 4 | −71.981  |        |         | where $d_0$ is a distance between the incident surface of the f-sine theta lens and the deflection mirror 27.

In this example the conditions are selected as follows:
The third-order distortion coefficient V: V=0.84
The distance D between the secondary principle point of the first optical unit $OU_1$ and the primary principal point of the second optical unit $OU_2$: D=0.18 f
The focal length $f_1$ of the first optical unit $OU_1$:

$$f_1 = -134.4 \text{ (mm)}.$$

The focal length $f_2$ of the second optical unit $OU_2$:

$$f_2 = 65.2 \text{ (mm)}.$$

EXAMPLE 2

Referring to FIG. 19, the first optical unit $OU_1$ and the second optical unit $OU_2$ comprise a single lens, respectively, both the optical unit forming the f-sine theta lens 28 shown in the aforementioned embodiments. The focal length of the f-sine theta lens is 100 mm, the F-number is selected F/60, and the view angle is 30 degrees.

TABLE 5

|   | r (mm)    | d (mm) | n       |
|---|-----------|--------|---------|
| 0 |           | 11.667 |         |
| 1 | −39.822   | 1.667  | 1.51509 |
| 2 | 117.31    | 16.667 |         |
| 3 | 334.169*  | 8      | 1.79883 |
| 4 | −45.009   |        |         |

* The surface of $r_3$ is formed into an aspherical surface. Assuming that the shape of the surface is expressed by:

$$Z = \frac{cy^2}{1 + \sqrt{1 - c^2(k+1)y}} + E_4 y^4 + E_6 y^6 \qquad (41)$$

where k is the conical constant, $E_4$ is the fourth-order coefficient, $E_6$ is the sixth-order coefficient, and c is curvature, then
$k = 6.863777$,
$E_4 = -6.9746 \times 10^{-7}$,
$E_6 = 1.80604 \times 10^{-11}$, and
$c = 1$ In this example the following conditions are selected:
The third-order distortion coefficient V: V=0.90
The distance D: D=0.21 f
The focal length $f_1$: $f_1 = -57.5$ (mm)
The focal length $f_2$: $f_2 = 50.1$ (mm)

EXAMPLE 3

Referring to FIG. 20, the first optical unit $OU_1$ comprises a single lens, while the second optical unit $OU_2$ comprises two lenses, both the optical units forming the f-theta lens 28 shown in the aforementioned embodiments. The focal length of the f-sine theta lens is 100 mm, the F-number is selected F/16.7, and the view angle is 20 degrees.

TABLE 6

|   | r (mm)    | d (mm) | n       |
|---|-----------|--------|---------|
| 0 |           | 12     |         |
| 1 | −35.26    | 1      | 1.48552 |
| 2 | 436.689   | 17.022 |         |
| 3 | −230.094  | 5      | 1.74949 |
| 4 | −55.664   | 0.1    |         |
| 5 | 225.042   | 5      | 1.74949 |
| 6 | −142.43   |        |         |

In this example the conditions are selected as follows:
The third-order distortion coefficient V: V=0.97
The distince D: D=0.22 f
The focal length $f_1$: $f_1 = -67.2$ (mm)
The focal length $B_2$: $f_2 = 53.2$ (mm).

EXAMPLE 4

Referring to FIG. 21, the first optical unit $OU_1$ comprises a single lens, while the second optical unit $OU_2$ comprises two lenses, both the optical units forming the f-sine theta lens shown in the aforementioned embodiments. The focal length of the f-sine theta lens is 100 mm, the F-number is selected F/25, and the view angle is 25 degrees.

TABLE 7

|   | r (mm)    | d (mm) | n       |
|---|-----------|--------|---------|
| 0 |           | 12     |         |
| 1 | −37.411   | 1      | 1.48552 |
| 2 | 567.962   | 17.319 |         |
| 3 | −267.615  | 5      | 1.74949 |
| 4 | −56.052   | 0.1    |         |
| 5 | 218.567   | 5      | 1.74949 |

TABLE 7-continued

| | r (mm) | d (mm) | n |
|---|---|---|---|
| 6 | −174.184 | | |

In this example the conditions are selected as follows:
The third-order distortion coefficient V: V=0.95
The distance D: D=0.22 f
The focal length $f_1$: $f_1$=−72.3 (mm)
The focal length $f_2$: $f_2$=54.7 (mm).

EXAMPLE 5

Referring to FIG. 22, the first optical unit $OU_1$ comprises a single lens, while the second optical unit $OU_2$ comprises two lenses, both the optical units forming the f-sine theta lens shown in the aforementioned embodiments. The focal length of the f-sine theta lens is 100 mm, the F-number is selected F/25, and the view angle is 30 degrees.

TABLE 8

| | r (mm) | d (mm) | n |
|---|---|---|---|
| 0 | | 12 | |
| 1 | −43.461 | 1 | 1.64379 |
| 2 | −862.388 | 16.308 | |
| 3 | 240.93 | 5 | 1.79883 |
| 4 | −55.064 | 0.1 | |
| 5 | 218.623 | 5 | 1.79883 |
| 6 | −213.846 | | |

In this example the conditions are selected as follows:
The third-order distortion coefficient V: V=0.93
The distance D: D=0.21 f
The focal length $f_1$: $f_1$=−71.2 (mm)
The focal length $f_2$: $f_2$=53.7 (mm).

EXAMPLE 6

Referring to FIG. 23, the first optical unit $OU_1$ comprises a single lens, while the second optical unit $OU_2$ comprises two lenses, both the optical units forming the f-sine theta lens shown in the aforementioned embodiments. The focal length of the f-sine theta lens is 100 mm, the F-number is selected F/25, and the view angle is 30 degrees.

TABLE 9

| | r (mm) | d (mm) | n |
|---|---|---|---|
| 0 | | 12 | |
| 1 | −40.099 | 1 | 1.48552 |
| 2 | 994.384 | 17.638 | |
| 3 | −277.019 | 5 | 1.74949 |
| 4 | −56.287 | 0.1 | |
| 5 | 198.956 | 5 | 1.74949 |
| 6 | −228.29 | | |

In this example the conditions are selected as follows:
The third-order distortion coefficient V: V=0.93
The distance D: D=0.22 f
The focal length $f_1$: $f_1$=−79.4 (mm)
The focal length $f_2$: $f_2$=56.6 (mm).

EXAMPLE 7

Referring to FIG. 24, the first optical unit $OU_1$ comprises a single lens, while the second optical unit $OU_2$ comprises two lenses, both the optical units forming the f-sine theta lens shown in the aforementioned embodiments. The focal length of the f-sine theta lens is 100 mm, the F-number is selected F/20, and the view angle is 30 degrees.

TABLE 10

| | r (mm) | d (mm) | n |
|---|---|---|---|
| 0 | | 12 | |
| 1 | −35.591 | 1 | 1.64379 |
| 2 | −220.410 | 16 | |
| 3 | −251.652 | 5 | 1.79883 |
| 4 | −59.189 | 0.1 | |
| 5 | 287.262 | 5 | 1.79883 |
| 6 | −132.333* | | |

*The surface $r_6$ is formed into an aspherical surface.

Assuming that the shape of the surface $r_6$ is expressed by:

$$Z = \frac{cy^2}{1 + \sqrt{1 - c^2(k + 1)y^2}} \quad (42)$$

where k is a conic constant and c is a curvature of the surface, then $$k = -3.302$$

$$c = \frac{1}{r_5}$$

In this example the conditions are selected as follows:
The third-order distortion coefficient V: V=0.94
The distance D: D=0.12 f
The focal length $f_1$: $f_1$=−66.1 (mm)
The focal length $f_2$: $f_2$=52.3 (mm).

EXAMPLE 8

Referring to FIG. 25, the first optical unit $OU_1$ comprises a single lens, while the second optical unit $OU_2$ comprises two lenses, both the optical units forming the f-sine theta lens shown in the aforementioned embodiments. The focal length of the f-sine theta lens is 100 mm, the F-number is selected F/25, and the view angle is 35 degrees.

TABLE 11

| | r (mm) | d (mm) | n |
|---|---|---|---|
| 0 | | 12 | |
| 1 | −28.789 | 1 | 1.64379 |
| 2 | −77.904 | 17.619 | |
| 3 | −287.164 | 5 | 1.79883 |
| 4 | −75.632 | 0.1 | |
| 5 | 310.056 | 7 | 1.79883 |
| 6 | −101.643* | | |

*The surface $r_6$ is formed into an aspherical surface.

Assuming that the shape of the surface $r_6$ is expressed by the equation (42), k=4.197 and c=(1/$r_5$.)

In this example the conditions are selected as follows:
The third-order distortion coefficient V: V=0.93
The distance D: D=0.24 f
The focal length $f_1$: $f_1$=−71.5 (mm)
The focal length $f_2$: $f_2$=55.4 (mm).

EXAMPLE 9

Referring to FIG. 26, the first and second optical units $OU_1$ and $OU_2$ comprise two lenses, respectively, both the optical units forming the f-sine theta lens shown in the aforementioned embodiments. The focal length of the f-sine theta lens is 100 mm, the F-number is selected F/12.5, and the view angle is 20 degrees.

TABLE 12

| | r (mm) | d (mm) | n |
|---|---|---|---|
| 0 | | 12 | |
| 1 | −50.112 | 2 | 1.51509 |
| 2 | −21.705 | 1.942 | |
| 3 | −19.747 | 2 | 1.51509 |
| 4 | −4571.2 | 30 | |
| 5 | −137.987 | 6 | 1.74969 |
| 6 | −50.529 | 0.1 | |
| 7 | 129.651 | 5 | 1.74969 |
| 8 | 7962.95 | | |

In this example the conditions are selected as follows:
The third-order distortion coefficient V: V=0.97
The distance D: D=0.35 f
The focal length $f_1$: $f_1 = -84.4$ (mm)
The focal length $f_2$: $f_2 = 64.6$ (mm).

EXAMPLE 10

Referring to FIG. 27, the first and second optical units $OU_1$ and $OU_2$ comprise two lenses, respectively, both the optical units forming the f-sine theta lens shown in the aforementioned embodiments. The focal length of the f-sine theta lens is 100 mm, the F-number is selected F/12.5, and the view angle is 20 degrees.

TABLE 13

| | r (mm) | d (mm) | n |
|---|---|---|---|
| 0 | | 12 | |
| 1 | −36.623 | 2 | 1.51509 |
| 2 | −28.341 | 1 | |
| 3 | −27.228 | 2 | 1.51509 |
| 4 | 550.524 | 15 | |
| 5 | −262.458 | 6 | 1.74969 |
| 6 | −54.907 | 0.1 | |
| 7 | 236.134 | 5 | 1.74969 |
| 8 | −145.052 | | |

In this example the conditions are selected as follows:
The third-order distortion coefficient V: V=0.97
The distance D: D=0.22 f
The focal length $f_1$: $f_1 = -63.7$ (mm)
The focal length $f_2$: $f_2 = 52.3$ (mm).

EXAMPLE 11

Referring to FIG. 28, the first and second optical units $OU_1$ and $OU_2$ comprise two lenses, respectively, both the optical units forming the f-sine theta lens shown in the aforementioned embodiments. The focal length of the f-sine theta lens is 100 mm, the F-number is selected F/15, and the view angle is 25 degrees.

TABLE 14

| | r (mm) | d (mm) | n |
|---|---|---|---|
| 0 | | 12 | |
| 1 | −42.002 | 2 | 1.51509 |
| 2 | −26.327 | 1.789 | |
| 3 | −23.946 | 2 | 1.51509 |
| 4 | 3311.1 | 18 | |
| 5 | −233.789 | 6 | 1.72309 |
| 6 | −50.519 | 0.1 | |
| 7 | 173.91 | 5 | 1.72309 |
| 8 | −285.371 | | |

In this example the conditions are selected as follows:
The third-order distortion coefficient V: V=0.95
The distance D: D=0.24 f
The focal length $f_1$: $f_1 = -70.9$ (mm)
The focal length $f_2$: $f_2 = 55.5$ (mm).

EXAMPLE 12

Referring to FIG. 29, the first optical unit $OU_1$ comprises two lenses, while the second optical unit $OU_2$ comprises three lenses, both the optical units forming the f-sine theta lens shown in the aforementioned embodiments. The focal length of the f-sine theta lens is 100 mm, the F-number is selected F/12.5, and the view angle is 20 degrees.

TABLE 15

| | r (mm) | d (mm) | n |
|---|---|---|---|
| 0 | | 10 | |
| 1 | −25.488 | 2.5 | 1.51509 |
| 2 | −18.759 | 2.5 | |
| 3 | −18.945 | 1 | 1.48601 |
| 4 | −113.302 | 18.511 | |
| 5 | −105.718 | 5 | 1.66846 |
| 6 | −50.217 | 0.1 | |
| 7 | −1794.9 | 5 | 1.66846 |
| 8 | −112.656 | 0.1 | |
| 9 | 160.017 | 4 | 1.71245 |
| 10 | −6708.2 | | |

In this example the conditions are selected as follows:
The third-order distortion coefficient V: V=0.98
The distance D: D=0.26 f
The focal length $f_1$: $f_1 = -74.5$ (mm)
The focal length $f_1$: $f_1 = 57.7$ (mm).

EXAMPLE 13

Referring to FIG. 30, the first optical unit $OU_1$ comprises two lenses, while the second optical unit $OU_2$ comprises three lenses, both the optical units forming the f-sine theta lens shown in the aforementioned embodiments. The focal length of the f-sine theta lens is 100 mm, the F-number is selected F/16.7, and the view angle is 30 degrees.

TABLE 16

| | r (mm) | d (mm) | n |
|---|---|---|---|
| 0 | | 15 | |
| 1 | −26.745 | 2.5 | 1.61986 |
| 2 | −19.071 | 2.5 | |
| 3 | −18.692 | 2 | 1.56459 |
| 4 | −84.463 | 17.616 | |
| 5 | −124.363 | 7 | 1.66846 |
| 6 | −50.862 | 0.1 | |
| 7 | −11681 | 7 | 1.66846 |
| 8 | −133.144 | 0.1 | |
| 9 | 191.299 | 6 | 1.66846 |
| 10 | −1326.6 | | |

In this example the conditions are selected as follows:
The third-order distortion coefficient V: V=0.97
The distance D: D=0.28 f
The focal length $f_1$: $f_1 = -76.4$ (mm)
The focal length $f_2$: $f_2 = 59.2$ (mm).

EXAMPLE 14

Referring to FIG. 31, the first optical unit $OU_1$ comprises two lenses, while the second optical unit $OU_2$ comprises three lenses, both the optical lenses forming the f-sine theta lens shown in the aforementioned embodiments. The focal length of the f-sine theta lens is 100 mm, the F-number is selected F/16.7, and the view angle is 30 degrees.

TABLE 17

| | r (mm) | d (mm) | n |
|---|---|---|---|
| 0 | | 15 | |

TABLE 17-continued

| | r (mm) | d (mm) | n |
|---|---|---|---|
| 1 | −26.564 | 2.5 | 1.51509 |
| 2 | −18.442 | 2.5 | |
| 3 | −18.268 | 2 | 1.51509 |
| 4 | −91.853 | 17.721 | |
| 5 | −123.418 | 7 | 1.66846 |
| 6 | −50.546 | 0.1 | |
| 7 | −53333 | 7 | 1.66846 |
| 8 | −131.941 | 0.1 | |
| 9 | 184.802 | 6 | 1.66846 |
| 10 | −2259.7 | | |

In this example the conditions are selected as follows:
The third-order distortion coefficient V: V=0.97
The distance D: D=0.28 f
The focal length $f_1$: $f_1 = -75.7$ (mm)
The focal length $f_2$: $f_2 = 59.0$ (mm).

EXAMPLE 15

Referring to FIG. 32, the first and second optical units $OU_1$ and $OU_2$ comprise a single lens, respectively, both the optical units forming the f-sine theta lens shown in the aforementioned embodiments. The focal length of the f-sine theta lens is 100 mm, the F-number is selected F/60, and the view angle is 30 degrees.

TABLE 18

| | r (mm) | d (mm) | n |
|---|---|---|---|
| 0 | | 10 | |
| 1 | −175.01* | 2.79 | 1.48601 |
| 2 | 56.05* | 51.247 | |
| 3 | 9539.7* | 5.77 | 1.79883 |
| 4 | −60.985* | | |

*All the surfaces are formed into aspherical surfaces.

Assuming that the shape of the surfaces are expressed by:

$$Z = \frac{cy^2}{1 + \sqrt{1 - c^2(k + 1)y^2}} + E_4 y^4 \quad (43)$$

where k is the conical constant, $E_4$ is the fourth-order coefficient, and c is the curvature, then
(i) The surface $r_1$:
  c=(1/$r_1$)
  k=−486.17
  $E_4$=0
(ii) The surface $r_2$:
  c=(1/$r_2$)
  k=15.719
  $E_4$=0
(iii) The surface $r_3$:
  c=(1/$r_3$)
  k=−2.3×$10^4$
  $E_3$=−8.513×$10^{-8}$
(iv) The surface $r_4$:
  c=(1/$r_4$)
  k=−0.2931
  $E_4$=−4.962×$10^{-8}$.

In this example the conditions are selected as follows:
The third-order distortion coefficient V: V=1.08
The distance D: D=0.55 f
The focal length $f_1$: $f_1 = -87.0$ (mm)
The focal length $f_2$: $f_2 = 75.9$ (mm)

EXAMPLE 16

Referring to FIG. 33, the first optical unit $OU_1$ comprises a single lens, while the second optical unit $OU_2$ comprises two lenses, both the optical lenses forming the f-sine theta lens shown in the aforementioned embodiments. The focal length of the f-sine theta is 100 mm, the F-number is selected F/25, and the view angle is 20 degrees.

TABLE 19

| | r (mm) | d (mm) | n |
|---|---|---|---|
| 0 | | 12 | |
| 1 | −26.079 | 1 | 1.61656 |
| 2 | −94.615* | 17.738 | |
| 3 | −202.464* | 3.5 | 1.79883 |
| 4 | −56.975 | 0.05 | |
| 5 | 189.031* | 3.5 | 1.79883 |
| 6 | −146.087 | | |

*The surfaces $r_2$, $r_3$ and $r_5$ are formed into aspherical surfaces.

Assuming that the surfaces are expressed by the equation (42), the surface $r_2$ is:

c=(1/$r_2$)

k=10.74 the surface $r_3$ is:

c=(1/$r_3$)

k=11.136 and the surface $r_5$ is:

c=(1/$r_5$)

k=−23.587.

In this example the conditions are selected as follows:
The third-order distortion coefficient V: V=1.00
The distance D: D=0.22 f
The focal length $f_1$: $f_1 = -58.7$ (mm)
The focal length $f_2$: $f_2 = 50.5$ (mm).

From the aforementioned examples, it will be understood that, in order to be adaptable for a flying-spot scanning apparatus, the f-sine theta lens may be designed as so to satisfy the conditions:

$$D > 0.18 \, f \quad (2)$$

$$-1.4 \, f < f_1 < -0.5 \, f \quad (3)$$

$$0.5 \, f < f_2 < 0.8 \, f \quad (4)$$

$$d_0 > 0 \quad (5)$$

where D is the distance between the secondary principal point of the first optical unit and the primary principal point of the second optical unit, f is the focal length of the f-sine theta lens, $f_1$ is the focal length of the first optical unit, $f_2$ is the focal length of the second optical unit, and $d_0$ is the distance between the reflection point on the deflecting mirror and the incident surface of the first optical unit.

While the invention has been illustrated and described as embodied an flying-spot scanning system, it is not intended to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A flying-spot scanning apparatus for recording an image on a recording medium by a plurality of scanning beams, comprising:
   a light source emitting a scanning beam;
   beam dividing means disposed along an optical axis for dividing the beam into a plurality of scanning beams;
   modulator means disposed after said beam dividing means for modulating the scanning beams;
   deflection means disposed after said beam dividing means for moving the scanning beams in a first direction;
   a recording medium on which an image is to be recorded, said recording medium being fed in a second direction perpendicular to the first direction, while the scanning beams move in the first direction;
   an objective lens disposed optically between said deflection means and the recording medium, said objective lens having the characteristic of:

$$h = f \sin \theta$$

where h is the distance on an object between the optical axis thereof and a point upon which the scanning beam impinges, f is the focal length of the objective lens, and $\theta$ is the angle formed by the scanning beam entering the objective lens with respect to the optical axis,
   said objective lens having the third-order distortion coefficient of approximately "1", through which the scanning beams are focused upon the recording medium to effect a row of scanning spots thereon; and
   sensor means for detecting both a position of the scanning spots and the intensity thereof on the recording medium, wherein a reference beam divided from the scanning beam impinges upon the deflection means to advance through the objective lens to said sensor means, the reference beam moving to scan said sensor means synchronously with the movement of the scanning spots,
   whereby substantially straight and parallel loci of the scanning spots are effected on the recording medium.

2. An apparatus as set forth in claim 1, wherein said deflection means comprises a rotation mirror reciprocatingly rotating in the forward and reverse directions.

3. An apparatus as set forth in claim 1, wherein said deflection means comprises a multifaced polygonal mirror rotating only in one direction.

4. An apparatus as set forth in claim 1, further comprising collimator means disposed optically before the deflection means, for collimating the scanning beam impinging upon the deflection means.

5. An apparatus as set forth in claim 1, further comprising a condenser lens disposed immediately after the light source, said condenser lens condensing the light emitted from the light source.

6. An apparatus as set forth in claim 1, wherein said sensor means comprises a grating bearing transparent strips and opaque strips one after another thereon, and photoelectric elements disposed behind the grating.

7. An apparatus as set forth in claim 1, wherein the reference beam is divided by a half-mirror from the scanning beam emitted from the light source.

8. An apparatus as set forth in claim 1, wherein the modulator means comprises an optical modulator, which is disposed immediately after said beam dividing means, the optical modulator means modulating the scanning beams individually.

9. An apparatus as set forth in claim 1, wherein said beam dividing means comprises a optical glass block having a first and a second plane surfaces that are parallel to each other, the beam emitted from the light source obliquely entering the first surface, which reflects between the first and second surfaces to emerge from the points on the second surface where the beam reflects.

10. An apparatus as set forth in claim 1, wherein said beam dividing means comprises an optoelectronic integrated circuit having a plurality of waveguides formed into a tree structure on a substrate.

11. An apparatus as set forth in claim 1, wherein said beam dividing means comprises:
   a plurality of ultrasonic-wave oscillators generating ultrasonic-wave signals having different frequencies;
   a plurality of ultrasonic-wave modulators connected to the oscillators, respectively, the ultrasonic-wave modulators modulating the signals on the basis of image signals applied thereto;
   a mixing circuit connected to the ultrasonic-wave modulators, mixing or synthesizing the ultrasonic-wave signals, which are applied to the optical modulator, whereby the beam entered the optical modulator being divided on the basis of different frequencies of the ultrasonic-wave signals.

12. An apparatus as set forth in claim 1, further comprising a beam compressor disposed immediately after the light source, said beam compressor reducing the diameter of the beam emitted from the light source.

13. A flying-spot scanning apparatus for recording an image on a recording medium by a plurality of scanning beams, comprising:
   a plurality of light sources for effecting a row of scanning beams;
   modulating means for directly and individually modulating said light sources;
   deflection means disposed along the optical axis of the apparatus for deflecting the scanning beams in a first direction;
   a recording medium on which an image is to be recorded, said recording medium being fed in a second direction perpendicular to the first direction, while the scanning beams move in the first direction;
   an objective lens disposed optically between said deflection means and the recording medium, said objective lens having the characteristic of:

$$h = f \sin \theta$$

where h is the distance on an object between the optical axis thereof and a point upon which a scanning beam impinges, f is the focal length of the objective lens, and $\theta$ is an angle formed by the scanning beam entering the objective lens with respect to the optical axis, said objective lens having the third-order distortion coefficient of approximately "1", through which the scanning beams are focused upon the recording medium to effect a row of scanning spots thereon; and sensor means for detecting both a position of the scanning spots and the intensity thereof on the recording medium, wherein a reference beam divided from the scanning beams impinges upon the deflection means to advance through the objective lens to said sensor means, the reference beam moving to scan said sensor means synchronously with the movement of the scanning spots, whereby substantially straight and parallel loci of the scanning beams are effected on the recording medium.

14. An apparatus as set forth in claim 13, wherein said deflection means comprises a rotation mirror reciprocatingly rotating in the forward and reverse directions.

15. An apparatus as set forth in claim 13, wherein said deflection means comprises a multifaced polygonal mirror rotating only in one direction.

16. An apparatus as set forth in claim 13, further comprising collimator disposed optically before the deflection means for collimating the scanning beams impinging upon the deflection means.

17. An apparatus as set forth in claim 13, wherein said sensor means comprises a grating bearing transparent strips and opaque strips one after another thereon, and photoelectric elements disposed behind the grating.

18. An apparatus as set forth in claim 13, wherein the reference beam is divided by a half-mirror from the scanning beam emitted from the light source.

19. An apparatus as set forth in claim 13, further comprising a beam compressor disposed immediately after the light source, said beam compressor reducing the diameter of the beam emitted from the light source.

20. An apparatus as set forth in claim 13, further comprising a condenser lens disposed immediately after the light source, said condenser lens condensing the light emitted from the light source.

21. A flying-spot scanning apparatus for recording an image on a recording medium, comprising:

a light source emitting a single scanning beam;

first deflection means for deflecting the scanning beam in a second direction at a predetermined angle, the scanning beam being deflected on the basis of ultrasonic-wave frequencies applied thereto;

second deflection means disposed along the optical axis of the apparatus for moving the scanning beam in a first direction;

a recording medium on which an image is to be recorded, said recording medium being fed in the second directions perpendicular to the first direction, which the scanning beam moves in the first direction, the scanning beam being deflected at a considerably higher frequency than the deflecting frequency in the first direction;

an objective lens disposed optically between said deflecting means and the recording medium, said objective lens having the characteristic of:

$$h = f \sin \theta$$

where h is the distance on an object between the optical axis thereof and a point upon which the scanning beam impinges, f is the focal length of the objective lens, and $\theta$ is an angle formed by the scanning beam entering the objective lens with respect to the optical axis, said objective lens having the third-order distortion coefficient of approximately "1", through which the scanning beam is focused upon the recording medium to effect a scanning spot; and sensor means for detecting both a position of the scanning spot and the intensity thereof on the recording medium, wherein a reference beam divided from the scanning beam impinges upon the deflecting means to advance through the objective lens to said sensor means, the reference beam moving to scan said sensor means synchronously with the movement of the scanning spot, whereby substantially straight and parallel loci of the scanning beam are effected on the recording medium.

22. An apparatus as set forth in claim 21, wherein said deflection means comprises a rotation mirror reciprocatingly rotating in the forward and reverse directions.

23. An apparatus as set forth in claim 21, wherein said deflection means comprises a multifaced polygonal mirror rotating only in one direction.

24. An apparatus as set forth in claim 21, further comprising collimator disposed optically before the deflection means for collimating the scanning beams impinging upon the deflection means.

25. An apparatus as set forth in claim 21, wherein said sensor means comprises a grating bearing transparent strips and opaque strips one after another thereon, and photoelectric elements disposed behind the grating.

26. An apparatus as set forth in claim 21, wherein the reference beam is divided by a half-mirror from the scanning beam emitted from the light source.

27. An apparatus as set forth in claim 21, further comprising a beam compressor disposed immediately after the light source, said beam compressor reducing the diameter of the beam emitted from the light source.

28. An apparatus as set forth in claim 21, further comprising a condenser lens disposed immediately after the light source, said condenser lens condensing the light emitted from the light source.

* * * * *